US011469879B2

(12) United States Patent
Choi

(10) Patent No.: US 11,469,879 B2
(45) Date of Patent: Oct. 11, 2022

(54) TEXT WATERMARKING METHOD AND APPARATUS FOR HIDING INFORMATION INTO TEXT DOCUMENTS

(71) Applicant: Markany Inc., Seoul (KR)

(72) Inventor: Jong Uk Choi, Seoul (KR)

(73) Assignee: Markany Inc., Seoul (KR)

( * ) Notice: Subject to any disclaimer, the term of this patent is extended or adjusted under 35 U.S.C. 154(b) by 24 days.

(21) Appl. No.: 17/082,165

(22) Filed: Oct. 28, 2020

(65) Prior Publication Data

US 2022/0131683 A1  Apr. 28, 2022

(51) Int. Cl.
*H04L 9/06* (2006.01)
*H04L 9/08* (2006.01)
*G06F 21/60* (2013.01)

(52) U.S. Cl.
CPC .......... *H04L 9/0618* (2013.01); *G06F 21/602* (2013.01); *H04L 9/0869* (2013.01)

(58) Field of Classification Search
CPC .... H04L 9/0618; H04L 9/0869; G06F 21/602
See application file for complete search history.

(56) References Cited

U.S. PATENT DOCUMENTS

| | | | |
|---|---|---|---|
| 9,753,957 B1* | 9/2017 | Easttom, II | G06F 16/972 |
| 2014/0157441 A1* | 6/2014 | Georgiev | G06F 16/84 |
| | | | 726/32 |
| 2017/0329943 A1* | 11/2017 | Choi | G06F 21/602 |
| 2020/0169382 A1* | 5/2020 | Factor | G06F 3/0608 |
| 2021/0258151 A1* | 8/2021 | Cristina | H04L 9/16 |

\* cited by examiner

*Primary Examiner* — Philip J Chea
*Assistant Examiner* — Sangseok Park
(74) *Attorney, Agent, or Firm* — Invenstone Patent, LLC

(57) ABSTRACT

One aspect of the present invention discloses a text watermarking method for hiding user information. The text watermarking method comprises inputting encryption variable set information with which to encrypt a target document, wherein the target document includes text, generating an encrypted block based on the encryption variable set information and embedding the encrypted block into the target document by using an embedding rule of the encrypted block. The encryption variable set information includes a predetermined random key value, a user ID, and information indicating the embedding rule of the encrypted block. The predetermined random key value and the information indicating an embedding rule of the encrypted block are managed in a non-disclosure manner.

20 Claims, 26 Drawing Sheets

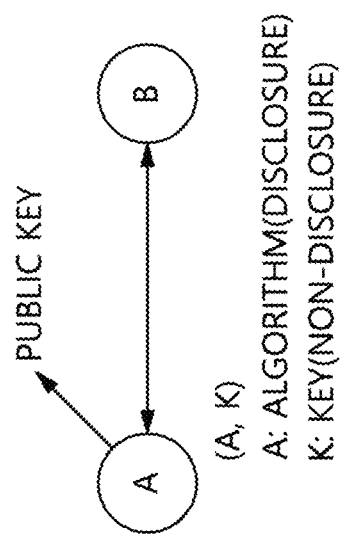

FIG. 5

DATE STRUCTURE OF FLIP-FLOP EMBEDDING ALGORITHM

| RANDOM KEY | | | | ID | ALTERATION RULE | | | | |
|---|---|---|---|---|---|---|---|---|---|
| RANDOM KEY | | | | USER ID | WORD (WD) | LINE (LN) | PARAGRAPH (PA) | PAGE (PG) | CHAPTER (CH) |
| HEAD INDENT | TAIL INDENT | HEAD RANDOM KEY | TAIL RANDOM KEY | | | | | | |

FIG. 15

FLIP-FLOP ALTERATION RULE(EXAMPLE)

| WD | 1 | 2 | 3 | 4 | 5 | 6 | 7 | 8 | 9 | 10 | 11 | 12 | 13 | 14 | 15 | 16 | 17 | 18 |
|----|---|---|---|---|---|---|---|---|---|----|----|----|----|----|----|----|----|----|
| LN |   |   | ■ |   |   | ■ |   |   | ■ |    |    | ■  |    |    | ■  |    |    | ■  |
| PR |   | ■ |   | ■ |   | ■ |   | ■ |   | ■  |    | ■  |    | ■  |    | ■  |    | ■  |
| PG |   |   | ■ |   |   | ■ |   |   | ■ |    |    | ■  |    |    | ■  |    |    | ■  |
| CH |   | ■ |   | ■ |   | ■ |   | ■ |   | ■  |    | ■  |    | ■  |    | ■  |    | ■  |

ALTERATION RULE: 3/LN, 2/PR, 3/PG, 2CH (LN: LINE, PR: PARAGRAPH, PG: PAGE, CH: CHAPTER)

FIG. 17

| INTER-WORD SPACE(WD) | | | | | | | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|
| WD | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 | 39 |
| BINARY MODE SWITCH | | | | | | ▓ | | | | | | | ░ | | | | | | | | | | | ▓ | | | | | | | | | ░ | | | | | ▓ | | |
| W1 | | | 2 | | 3 | | | | | | | 4 | | | | | 5 | | 6 | | | | 7 | | | | | | 8 | | | | 9 | | | | | | | |
| D | | | | | | | | | | | | | 1 | | | | | | | | | | | | | | | | | | | | | | | | | | | |
| PA | | | | | | | | | | | | | | | | | 2 | | | | | | | | | | | | | | | | | 0 | | | | 4 | | |
| PG | | | | | | | | | | | | | | | | | | | | | | | | | | | | | 3 | | | | | | | | | | | |
| CH | | | | | | | | | | | | | | | | | | | | | | | | | | | | | | | | | | | | | | | | |

INITIAL BINARY MODE = ▓

ALTERATION RULE: 3/LN, 2/PR, 3/PG, 2CH

FIG. 19

DATA FILE FOR ENCRYPTION AND DECRYPTION

|  | EXAMPLE |  |
|---|---|---|
| ETR | 0 | INITIAL REPRESENTATION OF BINARY MODE |
| ETL | 1 | INITIAL REPRESENTATION OF BINARY MODE |
| CURRENT MODE OF BINARY | ETR/ERL | POINTER OF CURRENT MODE OF BINARY REPRESENTATION |
| WD | 105 | NUMBER OF INTER-WORD SPACE |
| LN | 35 | NUMBER OF LINES |
| PA | 3 | NUMBER OF PARAGRAPHS |
| PG | 1 | NUMBER OF PAGES |
| CH | 1 | NUMBER OF CHAPTERS |
| RD-Key | 01001....01 | RANDOM KEY |
| ECC-Head | 11111111 |  |
| ECC-Tail | 00000000 |  |
| RD-Head Key | 0100 | RANDOM HEAD KEY |
| RD-Tail Key | 0001 | RANDOM TAIL KEY |
| RD-Head Key pointer | 5 |  |
| RD-Tail Key pointer | 7 |  |
| RD-Head Counter |  |  |
| RD-Taul Counter |  |  |

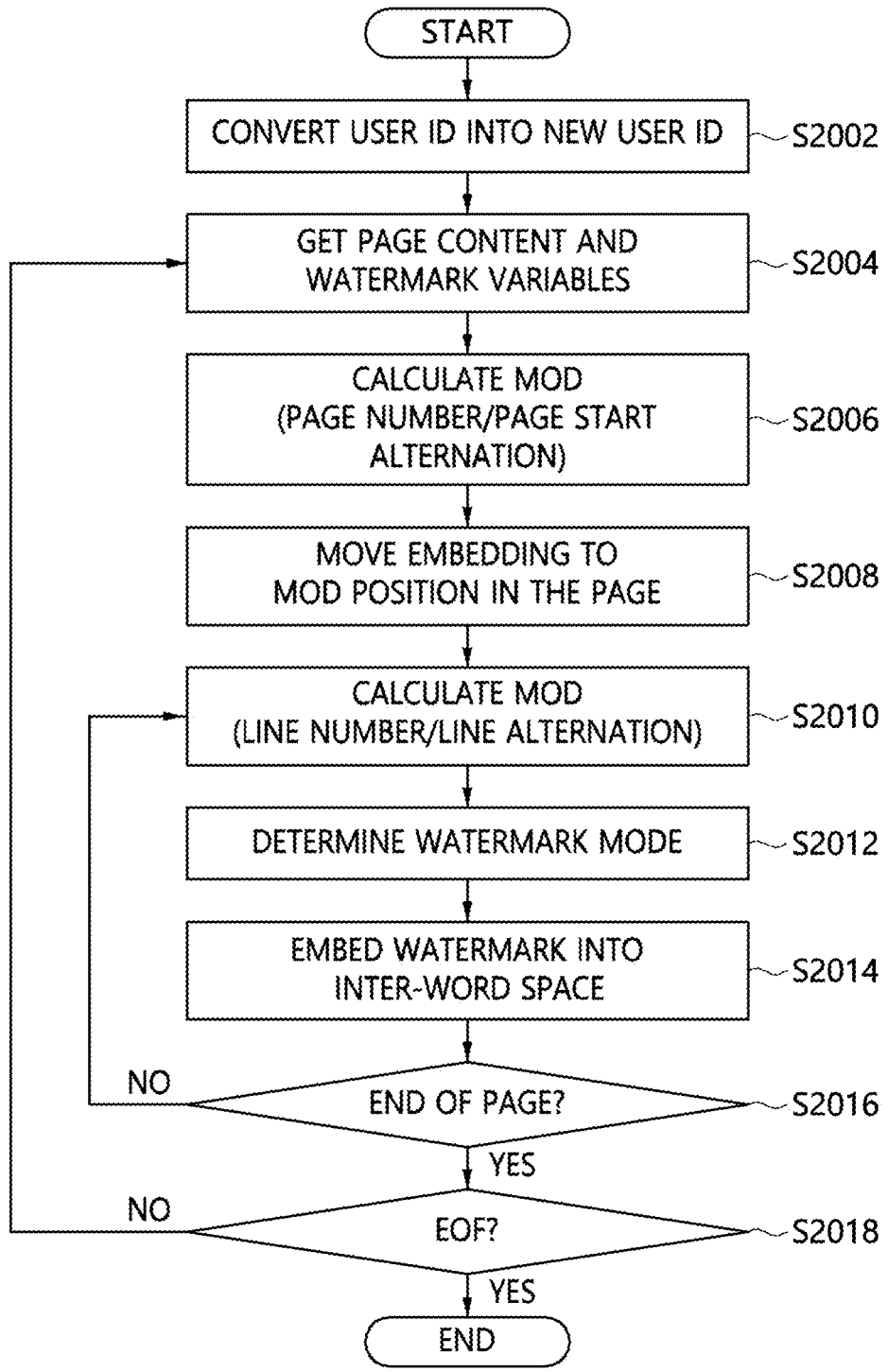

FIG. 22

TEXT WATERMARKING METHOD AND APPARATUS FOR HIDING INFORMATION INTO TEXT DOCUMENTS

BACKGROUND OF THE DISCLOSURE

Field of the Disclosure

The present invention relates to a text watermarking method, and more particularly, to a text watermarking method for hiding user information into text documents.

Related Art

Traditional encryption algorithms, regardless of the symmetric (private key) encryption algorithms, or public key algorithms, have been long employed for security of confidential information in transit, and in storage. Even if the encryption algorithm is open to the public and only if the key for communication between both parties are not disclosed, the confidentiality of the data in transit can be well protected. Information in storage is also well protected only if the key of encryption is not disclosed to the third party. Because the information is encrypted with the key unknown to the third party, proper reading of the encrypted data or document is not computationally possible with current resources.

However, with popular use of data editing technology, such as document editing tools and text manipulation programs, the security is being threatened. Even if the data in transition and storage can be protected from the third parties with encryption technology, when the information is legitimately decrypted for display and editing, it can be re-generated or printed for leakage. Various functions in editing programs can be used as a good vehicle of information leakage, which can easily paralyze encryption mechanisms. The editing functions of various programs have provided a good motivation of developing the technology of 'access control' for prevention of information leakage.

Development of enterprise-DRM (enterprise digital right management: E-DRM), consisted of encryption and access control component, was triggered by easy re-generation of the information using editing tools. Legitimate end-users decrypt confidential information and easily generate a new document file with the function of 'screen capture' or 'copy and paste' before re-generating a new file or information. Printing a confidential document and re-generating a new file through scanning might be another way of threating security officers. The enterprise-DRM systems attempt to prevent leakage of the information through access control and encryption. For example, user's access function in editing programs, such as 'print', 'copy and paste', 'send to the third parties', or 'open the file' are limited to some group of users, depending on the position, department, and job assignment.

This E-DRM has effectively protected confidentiality of information, even if some users dislike very strict application of security rule, which might block smooth cooperation work. For example, E-DRM systems have been employed in advanced research institutes (semi-conductor, automobile, ship-building, military weapon manufacturing factories, etc.), financial institutes, high-authority government organization, and others in Korea more than 20 years. It has been evaluated that those E-DRM systems effectively protected intellectual properties and privacy of customers from espionage activities in cyber space and from state-sponsored cyber-attacks. However, where the users are not accustomed to the inconvenience of the strict employment of access control in E-DRM systems, DLP (Data Loss Prevention) which relies on plugging security holes and network transmission of sensitive information has been chosen. However, device of various image capturing tools and portable devices have become a serious threat to information security.

FIG. 1A to FIG. 1C depict various spying devices which are in sales in the market.

Referring to FIG. 1A to FIG. 1C, recently various image capturing devices are available at much lower price than before. Especially, popular use of smart phone with high-resolution camera and video capturing tool nullify application of enterprise-DRM, and even DLP (Data Loss Prevention) which has been considered as an effective security tool. In addition, the confidential information can be leaked out in the form of printed document or data by legitimate users.

Tracing Mechanism

In this situation, where editing tools can alter hidden information in the electronic documents or data sheets and where various image capturing tools are available for capturing image or printing, challenges are (1) original documents or data should not be altered by users (2) forge of the document or data sheet should not be possible.

In the early days of emerging new electronic devices, such as copy machine for duplication of document and FAX (facsimile) machine for tele-transmission, ideas of 'text watermarking' appeared. Inventors of the text watermarking tried to prevent attempt of information leakage conducted with copy machine and fax transmission, by hiding invisible user information into the document and identifying the user information in case of illegitimate leakage to the third party.

Conventional Text Watermarking

Then, the first challenge is how to block utilization of the text manipulation mechanism of digital editing tools so that the hidden user's information embedded into the delivered documents is preserved intact as a legal evidence of illegitimate leakage. The first challenge in tracing mechanism may be solved by 'access control' mechanism of E-DRM system which attempts to nullify user activities of editing: 'reformat' 'alter fonts, style, or inter-word space by rearranging documents' 'copy and paste' and others. No change in the Hash value might be the best solution of this tool. However, as there are so many editing tools and data viewers provided to end users, one of the good solutions is a PDF viewer which can enforce access control while letting users to retrieve and properly view document.

The second challenge is that generation of forged document or data sheet should not be possible, no matter whether it is processed in electronic document form or printed paper document. If someone fully understands the algorithm of the text watermark and generates a new document with a hidden information of specific person or group, claiming that the person or group leaked out illegitimately the document. Technically, this challenge is so difficult to solve in the age of super-power computing and sophisticated crypto-analysis technology.

SUMMARY OF THE DISCLOSURE

An object of the present invention is to provide a method for hiding user information into text documents.

In an embodiment of the present invention, a text watermarking method comprises inputting encryption variable set information with which to encrypt a target document, wherein the target document includes text, generating an encrypted block based on the encryption variable set information and embedding the encrypted block into the target document by using an embedding rule of the encrypted block. The encryption variable set information includes a predetermined random key value, a user ID, and information indicating the embedding rule of the encrypted block. The predetermined random key value and the information indicating an embedding rule of the encrypted block are managed in a non-disclosure manner.

In some cases, the target document is divided in units of pages into page contents and at least one of a plurality of different encrypted blocks is arranged in each of the divided page contents.

Each of the plurality of different encrypted blocks comprises (i) indents arranged to bring confusion in determining a start point and an end point of the encrypted block, (ii) derived random key values, and (iii) the user ID. The indent and the derived random key value are derived by at least part of the predetermined random key value. The indent and the derived random key value is derived by a value extracted during movement by a predetermined unit of length in at least one of forward and backward directions from at least one of a front portion and a rear portion of the predetermined random key value.

The derived random key value includes a random head key value and a random tail key value. The length of the random head key value is determined by a value extracted during movement by a first length in the forward direction from a front portion of the predetermined random key value. A start point of the random head key value starts from end point of a piece of the predetermined random key value used for deriving a random head key value of a previous encrypted block. A start point of the random head key value is calculated by MOD[$\Sigma P_n$/Number of Round], wherein Number of Round represents an index of a target encrypted block for calculating the start point, and Pn represents the n-th portion of the predetermined random key value.

In some aspect of the present invention, the indent includes a head indent arranged in a front portion of the encrypted block and a tail indent arranged in a rear portion of the encrypted block. The head indent is determined by a value extracted during movement by a second length in the forward direction from a front portion of the predetermined random key value. The tail indent is determined by a value extracted during movement by the second length in the backward direction from a rear portion of the predetermined random key value.

In some aspect, length of the indent is flexible. And length of the encrypted block is dependent on the predetermined random key value and flexible.

Additionally, each of the plurality of different encrypted blocks is arranged in the order of a head indent, a random head key, a user ID, a random tail key, and a tail indent from a front end to a rear end.

Also, an error correction code is attached to at least one of the front and the rear portion of the encrypted block.

Additionally, the encryption block embedding rule includes a flip-flop text watermarking algorithm. The flip-flop text watermarking algorithm includes a rule that alternates a representation mode of binary information of the encrypted block for each predetermined portion of the target document. Information indicating the encryption block embedding rule includes a variable value of the flip-flop text watermarking algorithm. The variable value of the flip-flop text watermarking algorithm includes a variable value indicating the representation mode of the binary information alternating at least every which one of chapters, pages, paragraphs, and lines. Alternation of the representation mode of the binary information includes alternating manners that change at least one of inter-word space, inter-line space, inter-paragraph space, and inter-chapter space.

In other aspect of the present invention, a text watermarking method comprises inputting encryption variable set information with which to encrypt a target document, wherein the target document includes text, generating an encrypted block based on the encryption variable set information and embedding the encrypted block into the target document by using an embedding rule of the encrypted block. Here, the encryption variable set information includes a predetermined random key value and the predetermined random key is composed of random numbers. Also, the encrypted block is composed of (i) indents arranged to bring confusion in determining a start point and an end point of the encrypted block, (ii) random key values derived from the predetermined random keys, and (iii) the user ID. The encrypted block is arranged in the order of a head indent, a random head key, a user ID, a random tail key, and a tail indent from the front end to the rear end.

In another aspect of the present invention, a text watermarking apparatus comprises an interface module configured to input encryption variable set information with which to encrypt a target document, wherein the target document includes text and a processor configured to generate an encrypted block based on the encryption variable set information and embed the encrypted block into the target document by using an embedding rule of the encrypted block. The encryption variable set information includes a predetermined random key value, a user ID, and information indicating an embedding rule of the encrypted block. The predetermined random key value and the information indicating an embedding rule of the encrypted block are managed in a non-disclosure manner.

BRIEF DESCRIPTION OF THE DRAWINGS

FIG. 2A depicts one example of a text watermarking system.

FIG. 5 depicts a table that shows data structure of flip-flop embedding algorithm.

FIG. 15 depicts one example of a flip-flop alternation rule.

FIG. 17 depicts binary mode switch according to the coding of FIG. 16.

FIG. 19 depicts a data file for encryption and decryption through a text watermarking method according to one embodiment of the present disclosure.

FIG. 20 depicts a flow chart illustrating flip-flopping text watermarking algorithm according to an embodiment of the present invention in which the inter-word space adjustment is conducted with flip-flopping, based on algorithm to change direction of flip-flopping and determine the initial watermarking embedding.

FIG. 22 depicts sample of text watermark application.

DESCRIPTION OF EXEMPLARY EMBODIMENTS

Figure 1A:
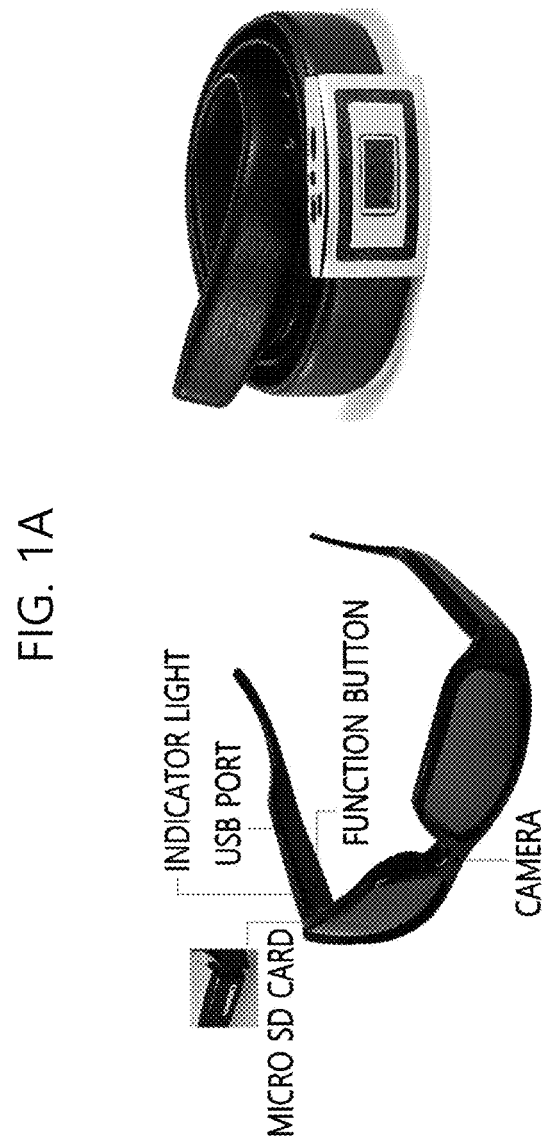
FIG. 1A to FIG. 1C depict various spying devices which are in sales in the market.
Figure 1B:
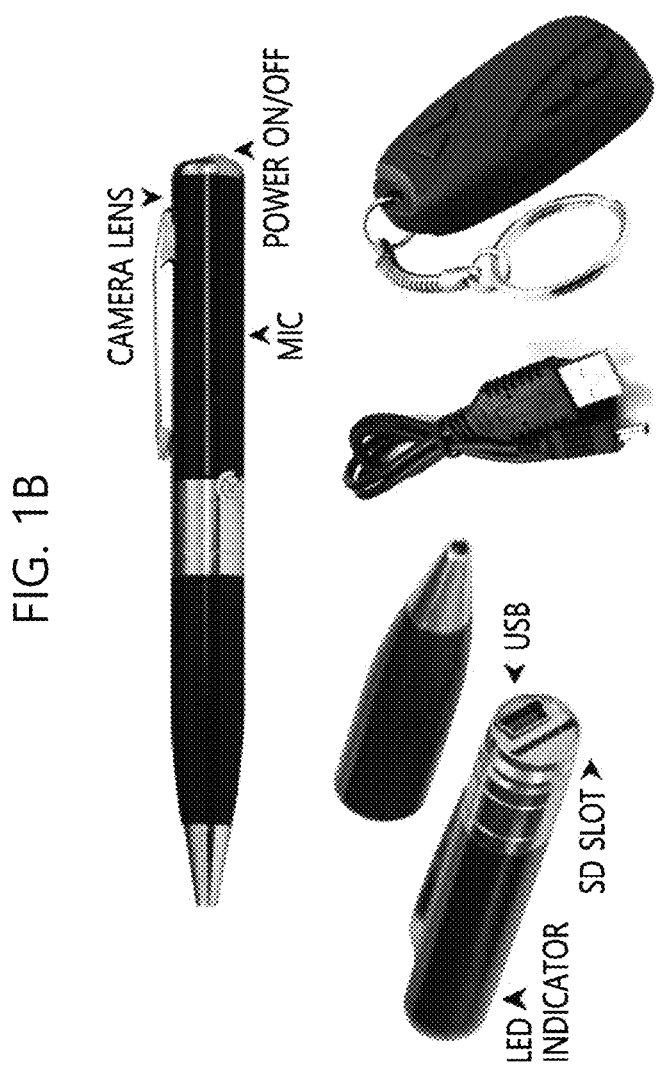
Figure 1C:
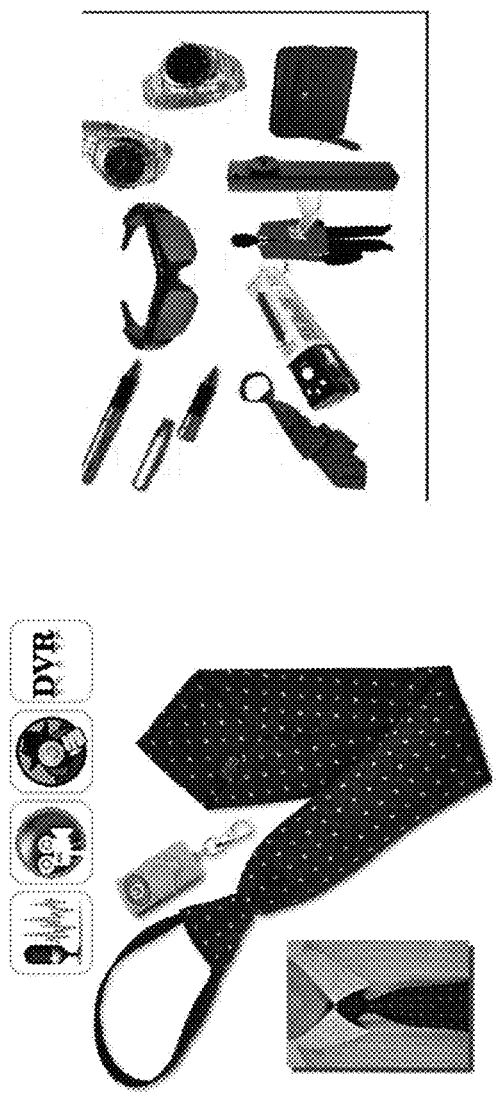

The present invention may have various modifications and various embodiments and specific embodiments will be illustrated in the drawings and described in detail.

However, this does not limit the present invention to specific embodiments, and it should be understood that the present invention covers all the modifications, equivalents and replacements included within the idea and technical scope of the present invention.

Terms such as first, second, and the like may be used to describe various components and the components should not be limited by the terms. The terms are used only to discriminate one constituent element from another component. For example, a first component may be referred to as a second component, and similarly, the second component may be referred to as the first component without departing from the scope of the present invention. A term 'and/or' includes a combination of a plurality of associated disclosed items or any item of the plurality of associated disclosed items.

It should be understood that, when it is described that a component is "connected to" or "accesses" another component, the component may be directly connected to or access the other component or a third component may be present therebetween. In contrast, it should be understood that, when it is described that an element is "directly connected to" or "directly access" another element, it is understood that no element is present between the element and another element.

Terms used in the present application are used only to describe specific embodiments, and are not intended to limit the present invention. A singular form may include a plural form if there is no clearly opposite meaning in the context. In the present application, it should be understood that term "include" or "have" indicates that a feature, a number, a step, an operation, a component, a part or the combination thereof described in the specification is present, but does not exclude a possibility of presence or addition of one or more other features, numbers, steps, operations, components, parts or combinations thereof, in advance.

If it is not contrarily defined, all terms used herein including technological or scientific terms have the same meanings as those generally understood by a person with ordinary skill in the art. Terms which are defined in a generally used dictionary should be interpreted to have the same meaning as the meaning in the context of the related art, and are not interpreted as an ideal meaning or excessively formal meanings unless clearly defined in the present application.

Hereinafter, preferred embodiments of the present invention will be described in detail with reference to the accompanying drawings. In describing the present invention, like reference numerals refer to like elements in the drawings for easy overall understanding and a duplicated description of like elements will be omitted.

Figure 2B:
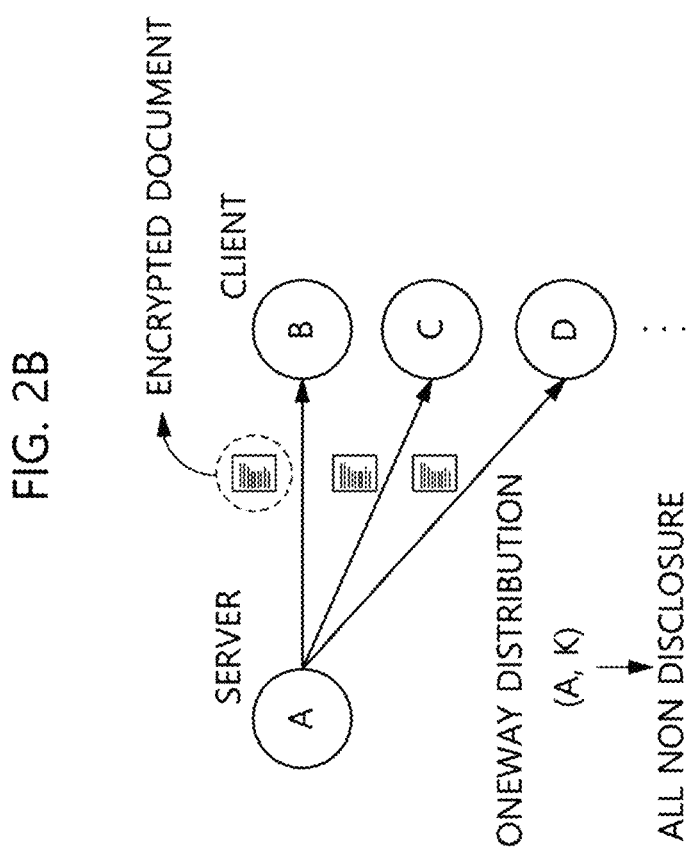
FIG. 2B depicts one example of a text watermarking system according to one embodiment of the present disclosure.

FIG. 2A depicts one example of a text watermarking system, and FIG. 2B depicts one example of a text watermarking system according to one embodiment of the present disclosure.

Referring to FIG. 2A, according to conventional encryption methods, when a person A, who distributes data such as documents, distributes the data to a recipient B, an algorithm related to encryption (A) is disclosed, but an encryption key is not disclosed. At this time, encryption may be conducted by using a public key and a corresponding private key. In particular, since the encryption methods are so structured that their algorithms are publicly known and keys correspond to each other, the structure may be suitable for bilateral exchange.

Referring to FIG. 2B, in an encryption structure employed by the text watermarking method according to one embodiment of the present disclosure, all of the encryption algorithms and keys may be non-disclosed. In other words, it is preferable that documents to be encrypted are distributed in a unilateral direction from a document distributer such as a corporate server to the client side and at this time, all encryption algorithms and key values are distributed privately. Here, it is desirable to use a random key rather than a public key for the encryption key value.

In other words, there are cases where communication can be conducted in one-way mode, rather than two-way mode requiring key sharing. Even in this one-way mode, the information can be encrypted and key can be delivered using various methods. However, in this case, concern of the sender is possibility of information leakage, rather than communication itself. For example, military information is distributed to various groups of staffs, soldiers, and officers in digital form, such as e-mail or SNS message. When this information is leaked out to the third party, it might be critical to military operation.

In this information hiding scheme, the exemplary purpose is tracing, rather than communications. For the reason, the algorithms including detailed implementation scheme should not be disclosed to the other parties. In other words, this information hiding algorithm is just one-way encryption, rather than two-way communication scheme.

This tracing scheme can be usefully applied to various situations: distributing military manuals and strategic decision documents, distributing confidential reports within law-firms and investment firms for legal disputes or large-scale investment, and others. Especially, this tracing scheme can be usefully employed for tracing photo-taken documents or hard-copy printed documents. Even if very careful investigation of the text documents delivered to employee-A and employee-B can reveal very miscellaneous difference in the documents, the difference cannot be visible to naked eyes.

Flip-Flop Text Watermarking

The purpose of the text watermarking method according to an embodiment of the present invention is to develop a tracing mechanism, rather than developing 'prevention' mechanism of the existing encryption system. Because of the hidden information invisible to naked eyes for tracing, the tracing mechanism might be practically effective in deterring information leakage in the age of micro-electronic devices if the mechanism can have legal power to testify correctly that the user key hidden in the leaked document belongs to the person who took shot of the document or printed the document. For example, person-A in a military industry took a shot of confidential document legitimately displayed on the screen and sent it through SNS or e-mail to the third party. Then, it can be a problem how to claim the person-A has leaked out the document in the court, only if the captured photo-shot of the document is available.

Based on the technical challenges, it is evident that the new tracing mechanism should satisfy the following requirements. First, not only the key embedded into the user document, but also the embedding algorithm should not be disclosed to the third party. The text watermarking method according to an embodiment of the present invention for tracing is different from the existing encryption schemes (symmetric algorithm and non-symmetric algorithm) in that the algorithm itself with user key is not disclosed, and therefore can be applied to one-way distribution mode in a limited computational environment. While the existing encryption scheme was invented for two-way communication, this tracing scheme according to an embodiment of the present invention aims to be applicable to one-way information distribution. The one-way distribution scheme can be applied to military operation, high-authority government office, cooperative R&D projects in advanced technology institutes, or confidential development of new bio-chemical materials.

Second, the key embedding algorithm should have encryption power which can nullify the third party's attempt to create a new document by embedding user key of someone else in the organization. Different from the modern encryption algorithms which employs the principle of substitution and permutation to implement the Shannon's basic properties of encryption, confusion and diffusion, this tracing scheme according to an embodiment of the present invention relies on only confusion. Therefore, the algorithm according to an embodiment of the present invention should be powerful enough to deceive crypto-analysis techniques which attempt to understand embedding algorithm and nullify the legal power of the tracing mechanism, by embedding an honest user's ID into the confidential documents and claiming that the document was leaked out by the honest user. If a sophisticated hacking technology creates a new document with an honest user and claims that the photo-taken document leaked out to the third party belongs to the honest user, it can be a problem how to show that the document was forged.

The tracing mechanism, called flip-flop text watermarking, according to an embodiment of the present invention is developed based on confusion by alternating embedding mode and adding random key to conceal the real-user key. However, in order to achieve the power of claiming legal evidences in the court and also achieving counter-claiming power that the photo-taken document was wrongly created with manipulation of tracing mechanism, the tracing mechanism should be confusing enough.

Basic Binary Unit: '0' and '1'

The flip-flop text watermarking utilizes a simple mechanism of text watermarking. In the early days of text watermarking development, various ideas may be adapted using inter-word space, line-shifting, and feature coding.

Figure 3:
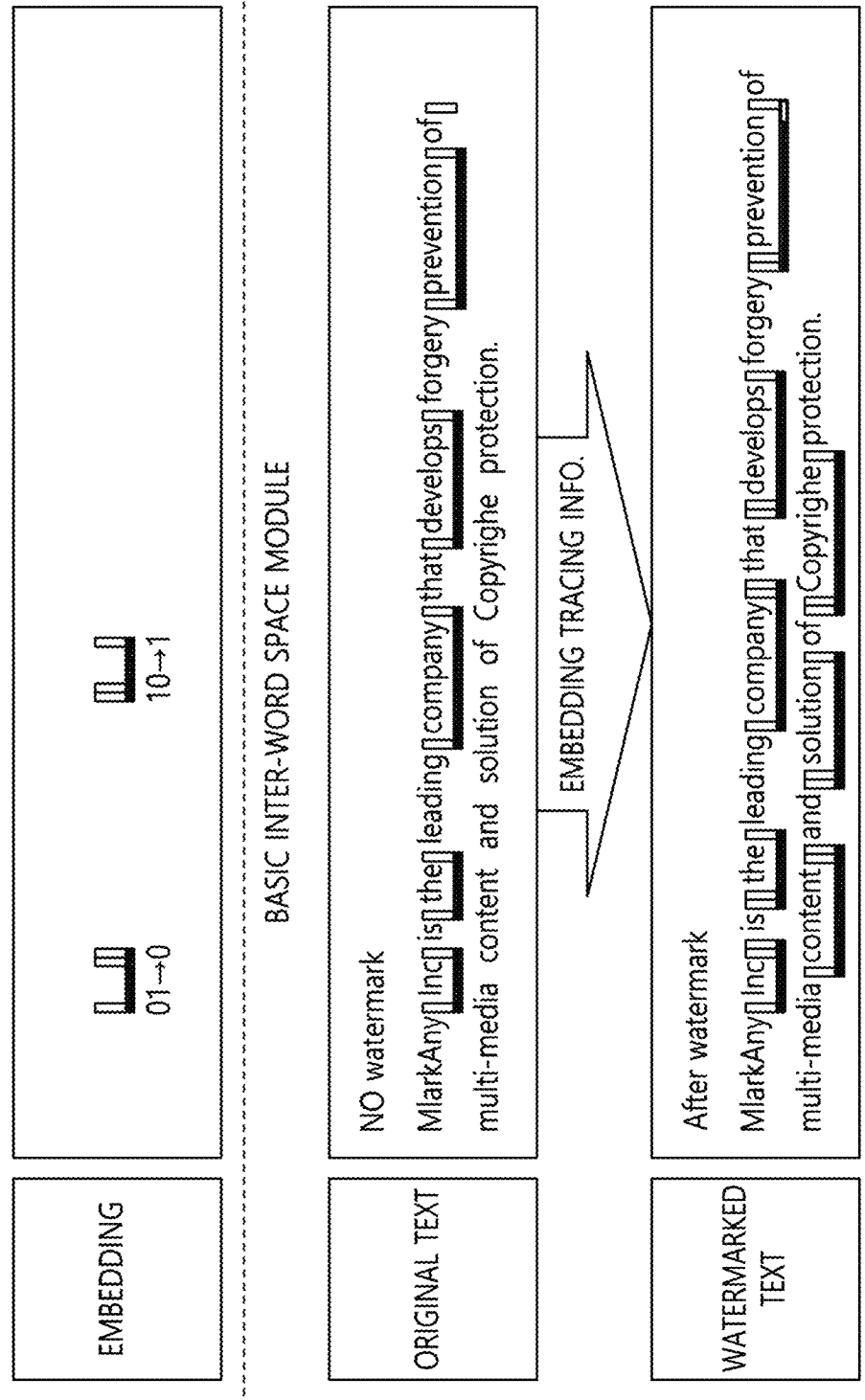
FIG. 3 depicts a schematic view of inter-word text watermarking.

FIG. 3 depicts a schematic view of inter-word text watermarking. As shown in FIG. 3, in the embodiment of the present invention, this inter-word text watermarking is employed as a basic structure for embedding user information in file-format converted document.

Referring to FIG. 3, inter-word space modulation embeds information by adding space to basic inter-word space. Even if the inter-word space can vary according to justification style, the basic inter-word space is only one space allocated between a word and a word. Then, allocation of one more space can simply represent '0', or '1'. That is, a method of modifying inter-character space can hide only one bit of information in the space, '0' or '1'. As shown in FIG. 3, '0' can be represented by one more space in back (empty space is added right side (ETR)), while '1' can be represented by one more space in front (a single empty space added to left side (ETL)). According to this representation, the watermarked text in FIG. 3 can read '01011011'.

However, the representation scheme can be reversed, depending on algorithm development. In the embodiment of the present invention, the representation of the information is called 'watermark mode', '0' as one more space in back, called as 'normal mode'. If the embedder changes the rule, as '1' as one more space in back, it is called 'reverse' to increase confusion for possible forgery attempt. At this moment, it should be noted that there is only two different possible ways to embed information into inter-word spaces, which is very important in designing the text watermark algorithm. This simple structure does not allow a complicated hiding scheme and therefore can lead to possible forgery of watermark information by simple trial-and-errors.

From the perspective of the enterprise security officers, the text watermarking algorithm and system should have following features: robust to forgery attack, but simple enough to process watermark embedding within limited time span. In addition, the embedded watermark should be strong enough to be detectable by a security program, while the effect of information hiding should be invisible to naked eyes. However, even if the time consumption and memory size required in processing watermark embedding might be a serious concern, computing resources necessary for detecting watermark will not be so important from the perspective of the security officers. Because the detection can be done in off-line mode, real time detection is not required.

First of all, the algorithm and embedding process should be complex enough so that the watermarked document cannot be easily forged. This is especially important in designing text watermarking. The enterprise security officers adopts text watermarking mechanism mainly to identify users who maliciously copies confidential information to transfer to third party, or takes photos of the documents displayed on screen. For example, the security officers install text watermarking system only to find who printed the confidential document and uploaded it to a P2P site after scanning it. For the reason, the most serious damage which can render text watermarking mechanism useless is possible forgery in which embeds information of an innocent employee into the document and circulate it for claiming that the innocent person leaked out enterprise confidentiality.

In considering this forgery case and designing robust algorithm, it is evident that the text watermark algorithms according to the embodiment of the present invention cannot achieve the same level of cryptographic strength as the following exemplary symmetric encryption algorithms, such as DES, AES, Twofish, Serpent, Blowfish, CAST5, RC4, RC5, 3DES, and Skipjack. Those symmetric encryption algorithms achieve confusion and diffusion through substitution and permutation, disappointing any attempt to make guess of outcome of encryption based on multiple pairs of a plain text and/or cipher text. For example, the encryption algorithm of DES goes through repeated mixing processes of substitution and permutation with the plain text and sub keys to produce an output, called the cipher text. The possible number of mapping process between the plain text and the cipher text might be almost unlimited, depending on the key length. However, in the text watermark, as the final value for each input number is very limited, the possible number of mapping between an ID number and the watermarked text may be very limited. For example, the number of '5' in DES algorithm can be transformed into one of 256 possible ASCII character, while the number of '5' in text watermarking can be transformed into one of two states, or at largest 5-10 different values. If the inter-character space modification algorithm exemplified above is employed for text watermarking, the possible value of watermarked values might be within 4. As a conclusion, as the text watermarking algorithm according to the embodiment of the present invention has inherent limitation, achieving cryptographic strength as robust as the exemplary symmetric encryption algorithm might not be possible.

In addition, the possible value of watermarked product might be limited by another requirement. The watermark itself should be invisible to naked eyes, but it should be detectable by detection mechanism. In other words, the watermark hidden into text is invisible that the difference between original document and watermarked document should not be noticeable. That is, the differences displayed on the screen should be imperceptible. However, when the text documents are leaked out to third party or photo-taken, the hidden watermark should be detectable by tracing mechanism. There is a tradeoff between invisibility of the watermark and detectability of hidden information. If the difference in the displayed document is perceptible, an employee may have feeling of 'being watched' and then try not to use the security system. However, if the system embeds too mild watermark, then detection will be difficult. That is why the security system should take a balanced approach.

According to other embodiment of the present invention, this way of binary representation, '0' and '1' can be conducted by other ways. One space can be added to the inter-word space to designate '0', while no space is added to represent for representing '1'. In reverse representation is possible, for example, one space is added to represent '1' while no space is added to represent '0'. Other ways of representation is to add a space to the end of line.

Confusion for Preventing Intelligent Guess

As described above, the simple unit of binary information embedding, regardless whether it represent user ID or enterprise ID, can alternate every time the embedding system meets predefined condition of line, phrase, page, or others. In the case mentioned above, one more empty space to right represents '0', while one more empty space to the left represents '1'. However, after two leaps one more empty space to the right represents '1', while one more empty space to the left represents '0'. Then, the situation can change again when the embedding system meets next page in which one more empty space to the right designates '0'. One more space to the left represents '1'. As a conclusion, the bit representation scheme alternates every time when the embedding system meets pre-defined conditions: line, page, phrase, or chapter. That is why this algorithm is called 'flip-flop text watermarking'.

The flip-flop algorithm aims at nullifying attempt of generating false information with intelligent guess, while hiding invisible information into document or data for providing legal evidence. The very important feature of the algorithm is 'confusion' by way of alternating the binary representation scheme. Because the representation scheme is alternating continuously, the third party cannot make correct guess.

Random Key, ID, and Alternation Rule

Recent development of crypto-analysis with advancement of high-power computing resources has made amazing successful results within a reasonable time. For example, some claims of cracking password might be practically valid that the user password can be found very quickly with the software tools using the techniques, dictionary attack, brute force attack, rainbow table attack, guess, spearing attack, and others. Even brute-force technique can work well using high-powered computing CPU.

In text watermark, the user ID or enterprise ID should be hidden repeatedly in the simple structure of '0' and '1' to prove in the court that the user leaked out the document or data. Because of the consistency implemented in repeated embedding, the information can legally verify that the owner of the ID leaked out the document. However, the consistency implemented in repeated embedding might be a source of cracking and generation of fake user. That is, the pattern hidden in repeated embedding should not be disclosed even in a full text of thousand pages.

Thus, in an embodiment of the present invention, there may be the verification power of the text watermark supported by consistent pattern of repeated embedding information into many different documents or data sheet, rather than repeated embedding in the same document or data sheet. Traditionally, the verification power of the existing text watermarking has been claimed in repeated applications of the same pattern in the same document or data sheet, enabling bilateral communication between two parties. However, in the embodiment of the present invention, there may be the repeated application of the same pattern of information hiding in various documents and data sheets can show trusted verification power in the court. For example, if the flip-flop algorithm can prove in the court that information of all the users in an organization can be decrypted from the documents stored in the database using the same data structure and same algorithm, it can have enough verification power. In fact, the same controversial argument happened in verifying copyright violation of music and movie in early 2000s in watermarking technology in audio and video.

Again, the underlying assumption of flip-flop text watermarking is (1) application of access control for the encrypted documents and datasheets, and (2) confusion against cracking effort based on pattern hiding.

In order to confuse attackers, the encryption system implemented in flip-flop text watermarking is constructed using 3 building blocks: Random Key, ID, and Alternation Rule. Even if the 3 building blocks (called an encryption block variable set) are applied repeatedly, the length of the encryption block is very flexible, depending on the binary number of Random Key. Because the random key of each organization or a user determines flexibly the length of ident (head indent and tail indent), random key (random head key and random tail key), embedding pattern of each block cannot be easily revealed, even if the 3 blocks of components are repeatedly applied in the same documents.

The role of random key is to hide encryption pattern through continuously modified ident (head indent and tail indent) and random key (random head key and random tail key), while the consistency of the algorithm and ID is maintained. The length and value of ID part of the flip-flop algorithm is fixed. However, as the encrypted part of the ID changes depending on the flip-flopping alternation rule, the hidden value of ID cannot be easily identified.

Figure 4:
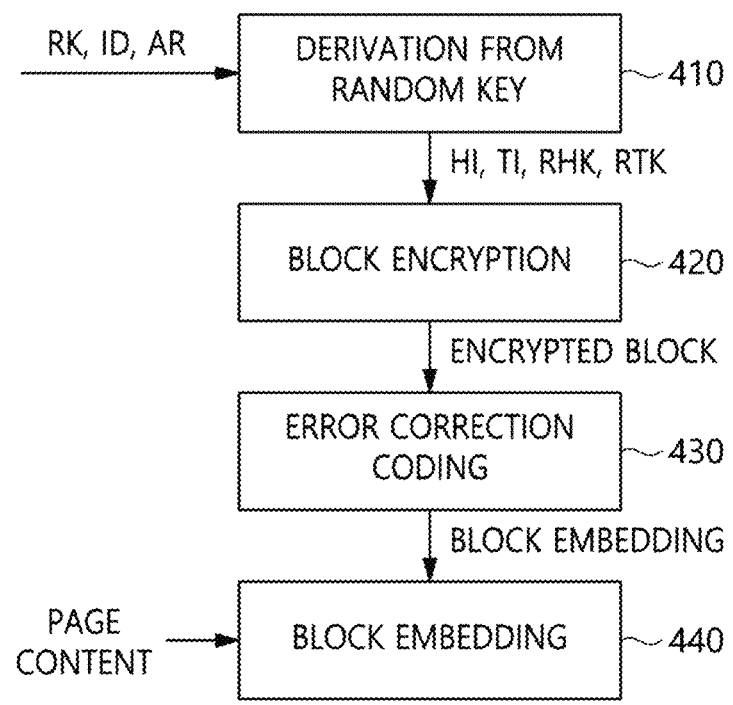
FIG. 4 depicts a flow diagram illustrating a text watermarking method according to one embodiment of the present disclosure.

FIG. 4 depicts a flow diagram illustrating a text watermarking method according to one embodiment of the present disclosure.

Referring to FIG. 4, a distributer server (hereinafter, it may be called an apparatus) may identify a target document for encryption and receive encryption variable set information. As described above, an encryption variable set may be called a building block. The encryption variable set may include a predetermined random key value, a user ID, and an alternation rule.

The apparatus derives values for generating encryption blocks from a random key according as the target document and encryption variable set information are received 410. Here, the derived values comprise an indent value including Head Indent (HI) and Tail Indent (TI); and a derived random key value including Random Head Key (RHK) and Random Tail Key (RTK).

As described above, the apparatus generates an encryption block by using the indent value and the derived random key value 420. The encryption block may be considered to be the data actually embedded into the target document along with the user ID, which may be referred to as an encrypted data block. The embedding may be conducted in such a way that dummy data, composed of as many 0s as the length corresponding to the indent value, are added before and after the encryption block, the random head key and the random tail key are inserted, and then the user ID is inserted into the central part. In some cases, the indent may be implemented by a blank value (a value other than 0).

As described above, after an encryption block is generated, the apparatus performs error correction coding (ECC) 430. In other words, the apparatus actually embeds a block including up to the error correction code into the encryption block.

Afterwards, the apparatus embeds a block into which the error correction code has been inserted into the target document according to the encryption block embedding rule 440. At this time, a predetermined alternation rule is applied. Also, it is preferable that the encryption block is generated and embedded for each of page contents. To this end, after a target document is selected, a task of dividing the contents of the target document for each page may be necessitated. In another example, division of contents and embedding of an encryption block in terms of the divided contents may be implemented in other forms different from the page contents. As one example, a target document may be divided into paragraph contents, and one encryption block may be embedded into each divided paragraph; also, the target document may be divided into chapter contents, and one encryption block may be embedded into each chapter. The various implementation options may be designed so that they may be changed through a user setting. Also, unit contents do not necessarily require one encryption block being embedded thereto. Some unit contents may be made so that an encryption block is not embedded thereto while some unit contents may be made so that a plurality of encryption blocks are embedded thereto.

FIG. 5 depicts a table that shows data structure of flip-flop embedding algorithm. As shown in FIG. 5, the flip-flop embedding algorithm according to one embodiment of the present disclosure includes a random key, a user ID, and an alternation rule-related variable value. A head indent, a tail indent, a head random key, and a tail random key are derived by a predetermined random key.

Figure 6:
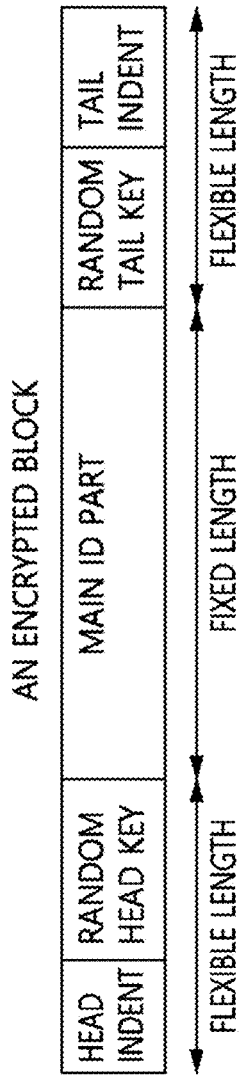
FIG. 6 depicts an encryption block used by a text watermarking method according to one embodiment of the present disclosure.

FIG. 6 depicts an encryption block used by a text watermarking method according to one embodiment of the present disclosure.

Referring to FIG. 6, an encryption block is used for embedding a random key value into the plain text according to the alternation rule. The encryption block may be arranged in the order of a head indent, a random head key, a primary ID part, a random tail key, and a tail indent. In other words, two indent values are arranged at the end portions, and the random head key value and the random tail key value are arranged at both ends of the inner portion. And the actual ID may be determined by a value of 2 to 8-digits. The ID may be arranged in the central portion of the encryption block. At this time, the lengths of the head indent, the random head key, the random tail key, and the tail indent may be flexible. The use of flexible lengths prevents intellectual reasoning. However, the user ID has a fixed value, and its length is also fixed.

The ID part in alternation rule can be arbitrarily determined by system operator, including the length and composition of the ID number. The alternation rule can be called an alternation rule. ID specified in this alternation rule can be a public key of a user or enterprise, binary number of user name or organization, or encryption date, or others. Then, the alternation rule specifies how the binary mode can change whenever it meets a new number of inter-word, new line, paragraph, or new chapter.

In general, the encryption system moves to the next round of encryption repeatedly by generating Indent, Random Head and Random Tail, and then integrating those pieces with ID, to create a block of Encryption Key.

Random Key

Figure 7:
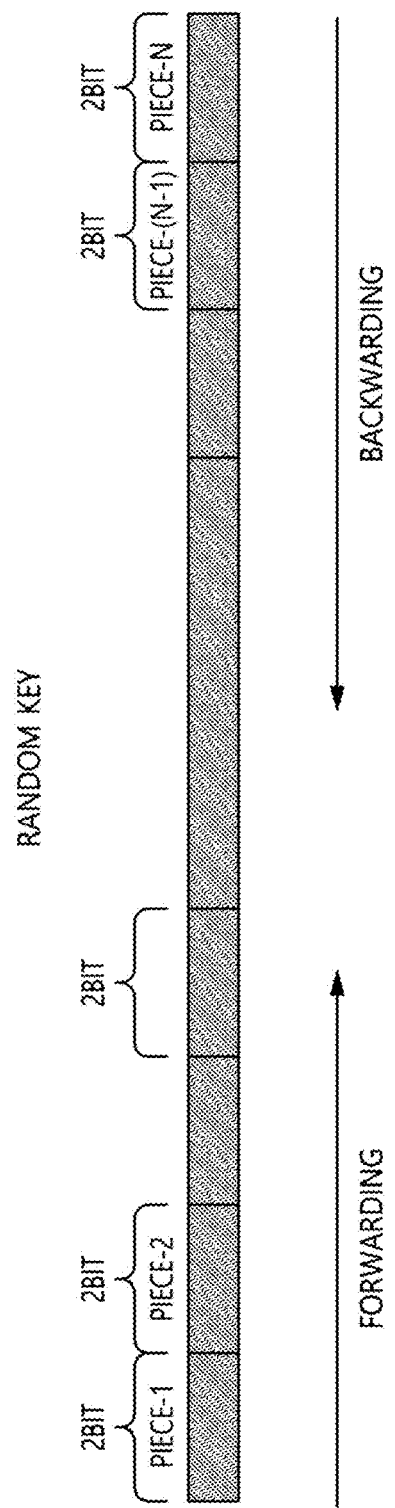
FIG. 7 depicts a structure of a random key.

FIG. 7 depicts a structure of a random key.

Referring FIG. 7, the random key in flip-flop text watermark plays an important and critical role in hiding user ID by flexibly changing the length and binary representation in encrypted text. Because the flip-flop text watermarking algorithm should hide into encryption key into a simple binary mode, '0' and '1', instead of 10 decimal numbers of traditional encryption algorithms, it is advisable to employ a long Random Key and short ID for accurate encryption and easy decryption.

The random number, even if it is chosen arbitrarily by the administer, should be consistently applied to all the documents created or distributed by the same user of an organization in order to claim that the document leaked out was created or delivered by the same user or member. If the user's ID and organization ID can be disclosed by cracking system in the same manner for the all documents created or distributed by the same member, it can be legally disputed that the document was leaked out by the false user. From the random key provided by administer or system operator, derived are Indent (Head Indent and Tail Indent), Random Head and Random Tail. It should be noted that the random number is a multiple of 4, for example, 16, 20, . . . , 1024. It should be noted that the 2 bit in Random Key is called 'piece' as shown in the FIG. 7.

Derivation of Indent

Figure 8:
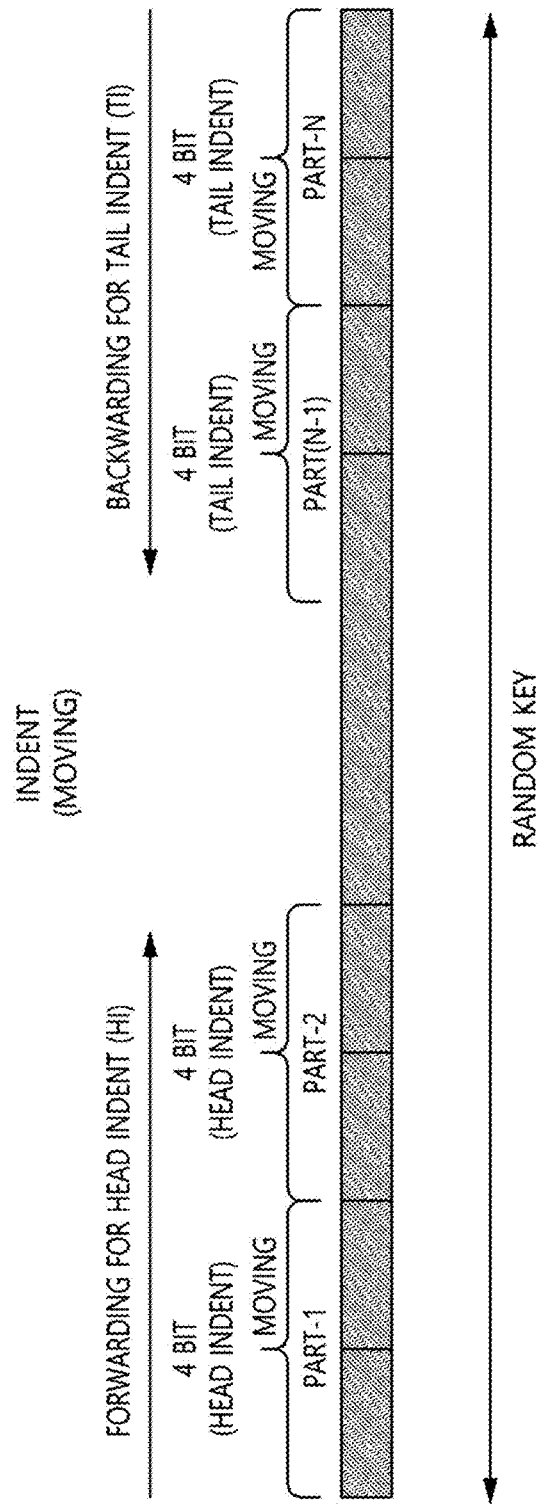
FIG. 8 depicts a method for deriving Head Indent (HI) and Tail Indent (TI) from the random key of FIG. 7.

FIG. 8 depicts a method for deriving Head Indent (HI) and Tail Indent (TI) from the random key of FIG. 7.

Referring FIG. 8, the first 4 bit of random number specifies the Head Indent, while the last 4 bit of random number determines Tail Indent. At this time, one part may represent two pieces, which may be a 4-bit data value. For example, if the first 4-bit block is 0010 (2 in decimal), then the encryption block begins with 2 positions indented to the left. Also, likewise, the last 4-bit determines how many positions should be indented to the end. In the flip-flop text watermarking, a position is defined as an inter-word space in which a bit of information can be embedded, using various schemes. Because the indent can be interpreted as '0' or '1', depending on the encryption structure, the Indent is added to the encryption block. The specification of Head Indent (HI) moves in forward direction: the first 4-bit block for the first encryption block, the second 4-bit block for $2^{nd}$ encryption block, . . . and then round robin way. Likewise, the specification of Tail Indent (TI) moves in backward direction: the first 4-bit of Random key determines the Tail Indent of the first encryption block, and the $2^{nd}$ 4-bit in backward determines Tail Indent of $2^{nd}$ encrypted block.

Indent is an important concept to hide beginning and termination of an encryption block. Because the length and representation of the Indent (Head and Tail) in the encrypted block are flexibly changed depending on the order of the encryption block, it can provide more confusion to the cracking efforts. For example, if the Head Indent in the $1^{st}$, $2^{nd}$, and $3^{rd}$ encryption block are 0010 (2 in decimal), 0000 (0 in decimal), and 0011 (3 in decimal) and also Tail Indents are 0100 (4 decimal), 0011 (3 in decimal), and 1000 (8 in decimal), it is very confusing for the cracking system to find beginning and termination of an encryption block.

Another purpose of the Indent is to identify an encryption block for decryption. For example, when the decryption module tries to find a block of encrypted text, it should find 4-bit of number in the Random Key. Later, it will be discussed that the 4-bit of Head Indent specification in forwarding direction is inter-related to Random Head Key, while the 4-bit Tail Indent specification in backward direction is inter-related to Random Tail Key.

In another example, the length of the indent value may not necessarily be determined by one part, namely, a value of two pieces. For example, the length may be determined by a 2-bit value (namely, a value of one piece). Alternatively, the length may be determined by a value of a different length such as 1-bit, 5-bit, 8-bit, or 10-bit. The length may be configured to be changed through a user setting.

In addition, the length of a random head key to be described below and the length used for deriving a value of the key may not necessarily have to be configured by one part. In the same way how the length of the indent value is derived, the lengths may be derived by a value of the random key having a different unit length. However, the unit length used for deriving the length of the indent value may not necessarily be the same as the length of the random head key and/or tail key or the unit length used for deriving a key value. In other words, the length of the indent key value may be derived from the random key value in units of parts, and the length of the random head key or tail key may be derived from the random key value in units of pieces.

Derivation of Random Head and Random Tail

Figure 9:
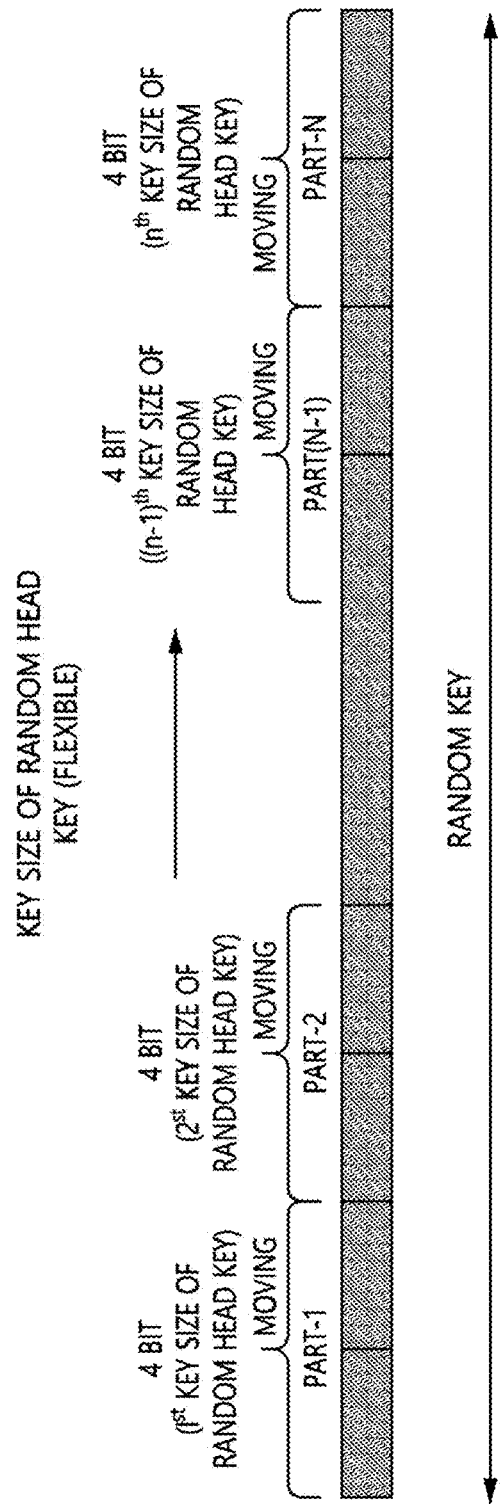
FIG. 9 depicts a method for determining the size of a random head key from the random key of FIG. 7.

FIG. 9 depicts a method for determining the size of a random head key from the random key of FIG. 7.

Referring FIG. 9, from the random key, derived are not only the Indent, but also Random Head and Random Tail. The same number of 4-bit in n-th part in forwarding direction specify the number of parts of Random Head key, while the same of 4-bit in n-th part in backward direction specify the number of pieces of Random Tail key. In other words, the number of parts in moving forward is tightly interrelated with number of Indent Head, while the number of parts in moving backward is interrelated with the number of Indent Tail. For example, if the random key of an organization or a user is 0010 1010 1100 1001 1001 1100 1001 1110 0110 1100 0001 1111 1011 1001 0100 0011, 64 bits in binary number, as shown in FIG. 9.

In the embodiment of FIG. 9, the size of a random head key of the first encryption block is determined by part 1. Since part 1 is 0010, the size is 2 pieces. The size of a random head key of the second encryption block is determined by part 2. Since part 2 is 1010, the size may amount to 10 pieces.

Figure 10:
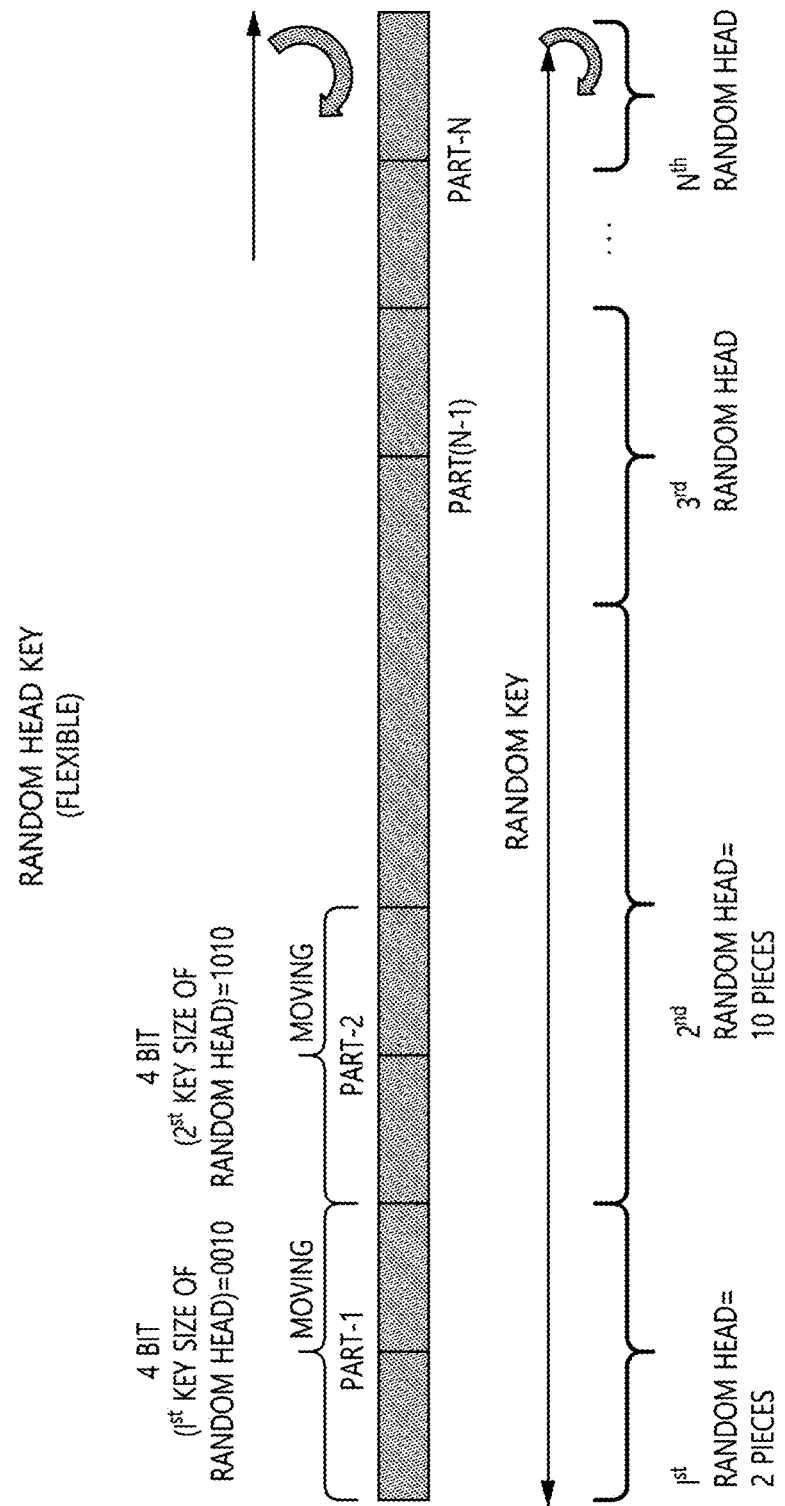
FIG. 10 depicts a method for deriving a random head key value having a size determined by the method of FIG. 9.

FIG. 10 depicts a method for deriving a random head key value having a size determined by the method of FIG. 9.

Referring to FIG. 10, the first random head key value is determined by the value of 2 pieces, and the second random head key value is determined by a value of 10 pieces counted from where the first random head key is ended. The third random head key is determined to have the size determined by the value of part 3, which spans from where the second random head key is ended. As described above, given random keys are traversed in circular order while random head keys are being derived, and random head key values are derived continuously in the round-robin scheme.

Figure 11:
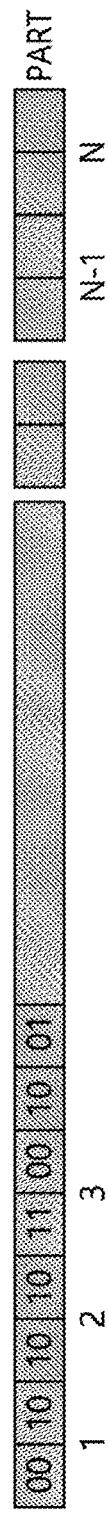
FIG. 11 depicts a method for calculating a pointer of a random head.

FIG. 11 depicts a method for calculating a pointer of a random head.

Referring to FIG. 11, after the round-robin scheme is applied, the start point of a random head may be determined as follows.

The $1^{st}$ part of the random key (the first 4-bits=0010) determines how may pieces the encryption pointer moves, and the $2^{nd}$ part of the random key (the $2^{nd}$ 4-bit=1010) specifies movement of the Random Head pointer. The $3^{rd}$ movement might be 12 pieces, 2 pieces in the first round of random key and 10 more pieces in the second round of the random key visit. In general, we can say MOD[$\Sigma Pn$/Number of Round]=pointer of Random Head.

Figure 12:
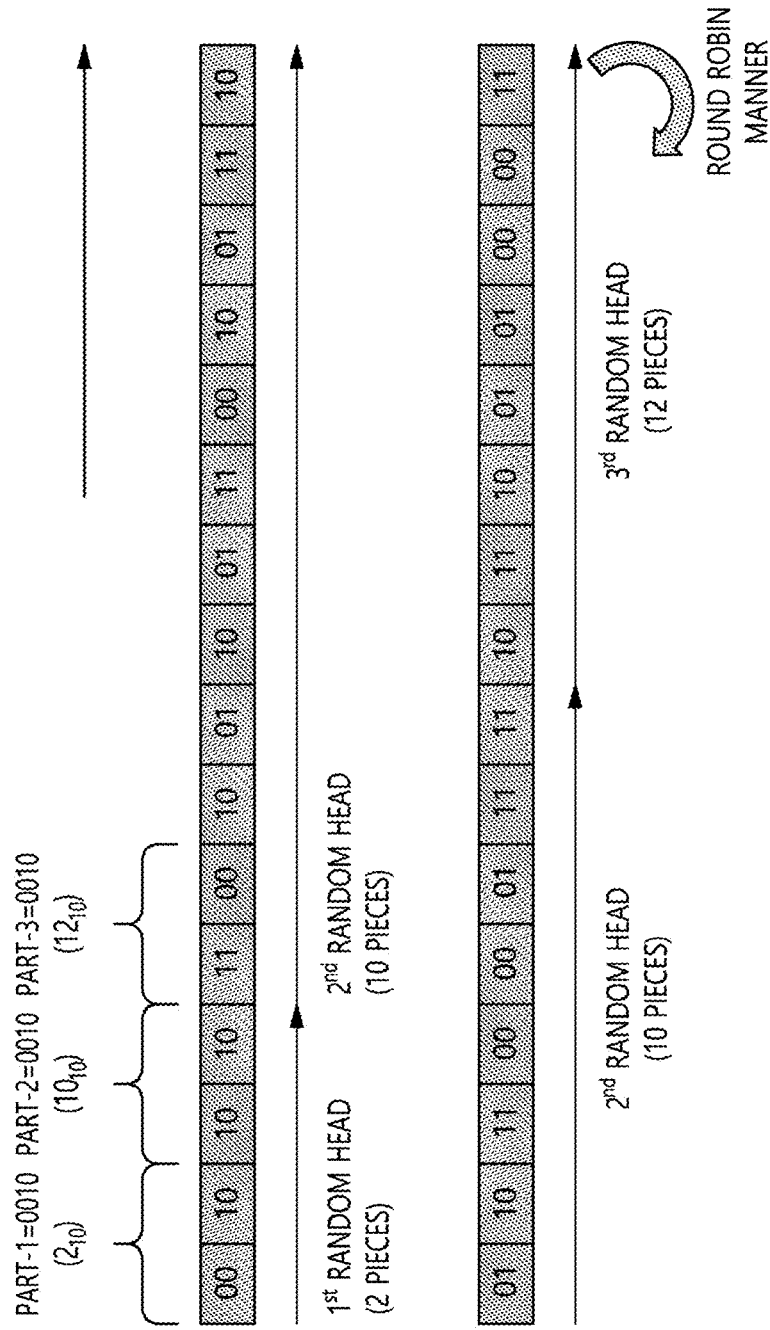
FIG. 12 depicts a method for deriving a random head key value from a random key through the methods of FIGS. 9 to 10.

FIG. 12 depicts a method for deriving a random head key value from a random key through the methods of FIGS. 9 to 10.

Referring to FIG. 12, from part-1 of the given random key, a value of decimal number 2 is derived, by which the length of a random head key of the first encryption block is determined to have the size of 2 pieces, and a random head value corresponding to the length is determined to be 00101010. Next, a value of decimal number 10 is derived from part-3, by which the length of a random head key of the second encryption block is determined to have the size of 10 pieces, and a random head value corresponding to the length is determined to be 1100100110011100100111100110110000011111. Next, the random head value of the third encryption block is determined to have the value of 12 from part-3, where the random head value is derived as a random key value with a length of 12 pieces counted from where the second random head key value is ended. At this time, since the random key values have been fully traversed for one round, the random head value is derived in a return direction according to the round-robin scheme.

Figure 13:
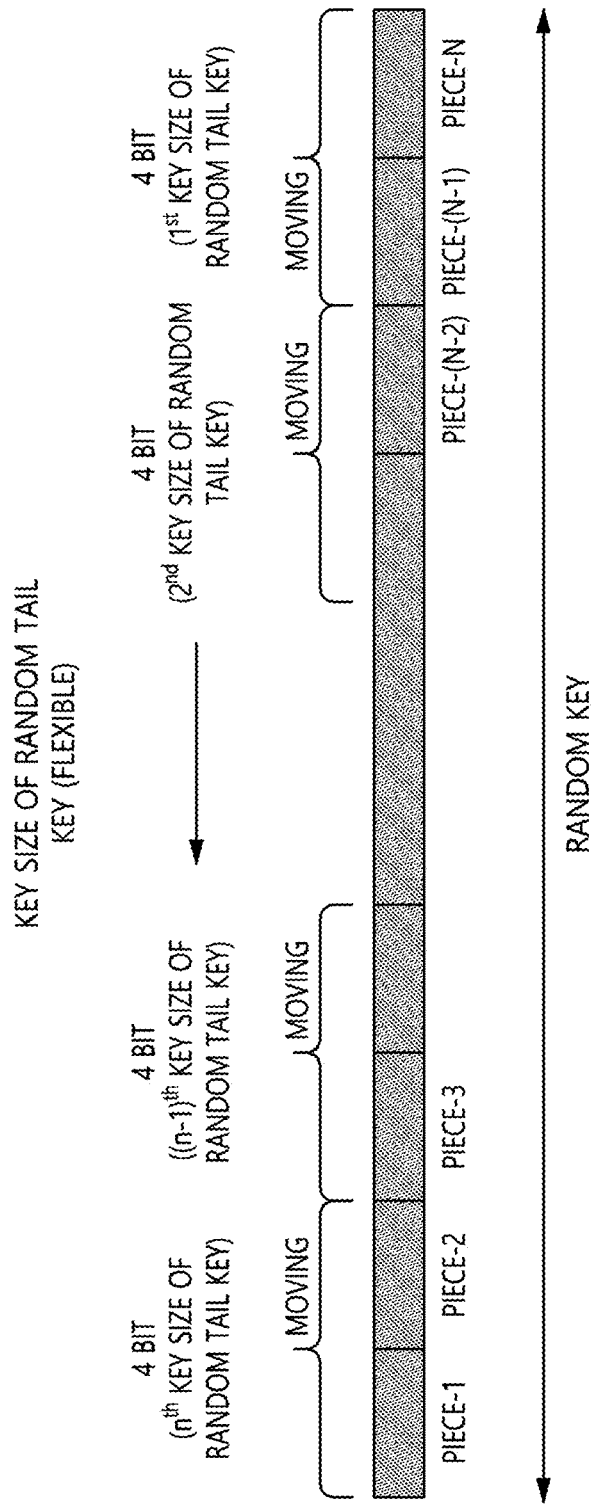
FIG. 13 depicts a method for determining the size of a random tail key from the random key of FIG. 7.

FIG. 13 depicts a method for determining the size of a random tail key from the random key of FIG. 7.

Referring to FIG. 13, a random tail key is generated by deriving a value of a random key in the exactly opposite direction for generation of a random head key. In other words, if the size and value of a random head key are derived in the forward direction from the front portion of a random key, the size and value of the random tail key are derived in the backward direction from the rear portion of the random key. In other words, the length of the random tail key value is determined by a 4-digit value of the n-th part of the last digit. The random tail value of the second encryption block is determined by a 4-digit value of the (n−1)-th part.

Figure 14:
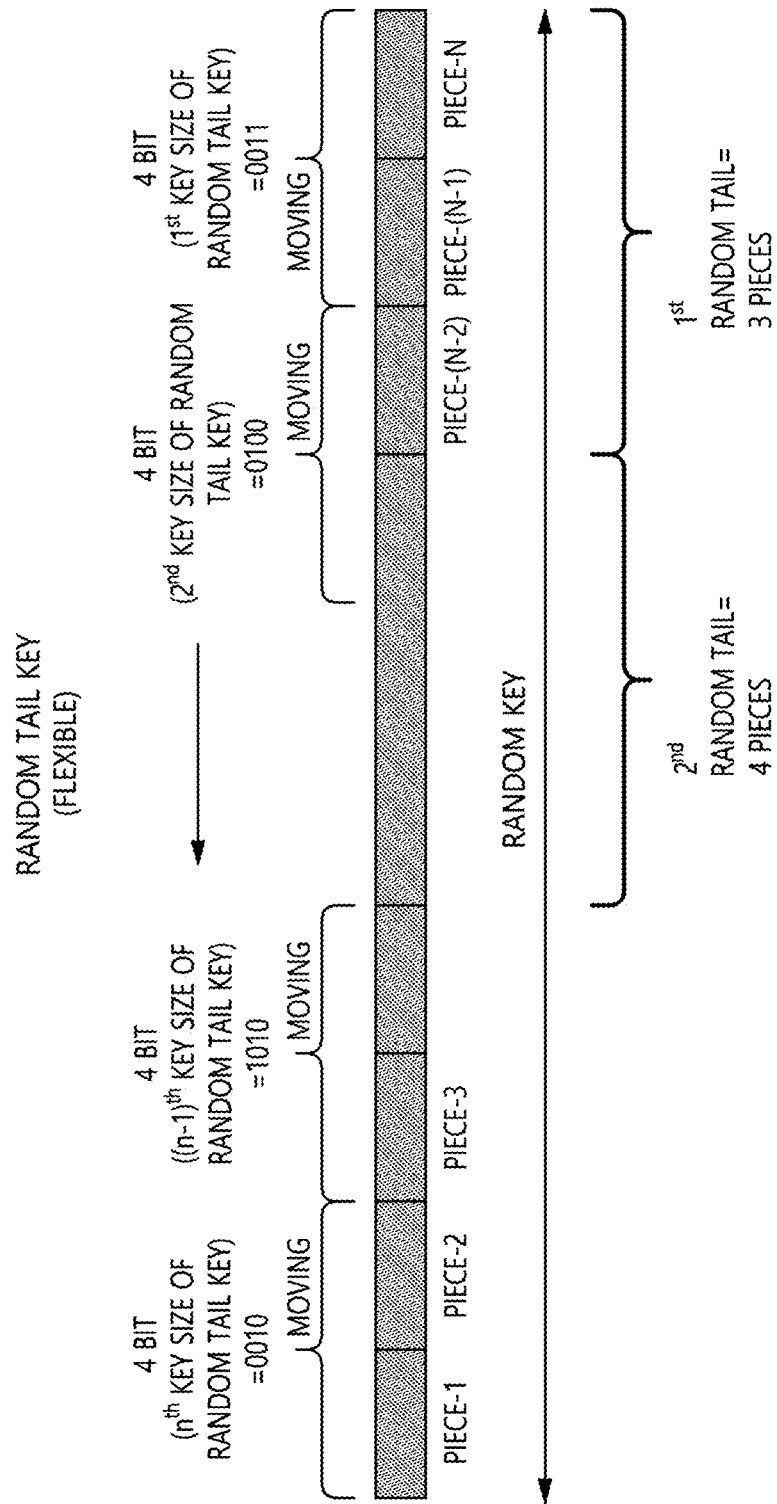
FIG. 14 depicts a method for deriving a random tail key value having a size determined by the method of FIG. 13.

FIG. 14 depicts a method for deriving a random tail key value having a size determined by the method of FIG. 13.

Referring to FIG. 14, the size of a random tail key of the first encryption block is determined to be 3 pieces by the value (0011) of part-n. Therefore, the value of the random tail key is determined by the value of 3 pieces from the last digit of the random key. The size of a random tail key of the second encryption block is determined to be 8 pieces by part-(n−1). The value of the random tail key is determined from the value of 8 pieces starting from where the random tail of the first encryption block is ended.

Additionally, in other to make decryption easy and to confirm the encryption process correct, Error Correction Code ECC is introduced. If ECC is added to the tail of encryption block, the encryption block can be easily distinguished from other extra parts. ECC part works as the following. If the Key of a user, consisted of Indent Head+Random Head+ID+Random Tail+Indent Tail, is specified by the following binary code, 0010 1010 1100 1001 1001 1100 1001 1110 0110 11001 0001 1111 1011 1001 0100 0011 and alternation rule is specified by (3/LN, 2/PR, 3/PG, 2CH) (every 21 word, 3 line, 2 paragraph, 3 page, 2 chapter), every encryption block keeps encryption record. Meanwhile, the ECC may be attached before and after the encryption block. The ECC may have a length of 10 pieces. Or, the ECC may have a flexible length.

In an embodiment of the present invention, Error Correction Code (ECC) is defined as a summed alternation for binary mode. The binary mode is defined as a user-defined representation of '0' and '1' using physical space between word, or space between lines, or space between pre-defined character or specific figures.

Additionally, in order to achieve stronger security, it is advisable to employ a simple HASH algorithm.

Alternation Rule

Alternation rule is the other core part of this flip-flop algorithm, specifying how the encryption key is applied to the plaintext to hide invisibly ID (user ID and/or enterprise ID) into data or documents. Even if the encryption system begins with a simple basic binary mode, for example, 'extended to the right' ETR or 'extended to the left' ETL, or others, the binary mode continuously changes according to the alternation rule.

Alternation of binary mode is explained here again for clearing the concept of 'alternation'. For example, it may be assumed that when the system starts the encryption with the initial binary mode.

In this scheme, ETR designates '0', while ETL represents '1'. However, the binary representation alternates whenever the encryption system meets new line, new paragraph, new page, or new chapter, depending on the predetermined encryption algorithm.

FIG. 15 depicts one example of a flip-flop alternation rule.

Referring to FIG. 15, if the encryption algorithm employs the rule of (3/LN, 2/PR, 3/PG, 2CH), the binary mode representation alternates every 3 lines, every 2 paragraph, every 3 pages, and every 2 chapters. Sometimes, in this case, the alternation of line, paragraph, page, and chapter can overlap. The resolution of overlapping can be done by '1' bit alternation or '0' bit alternation.

In the example case, it may be assumed that the encryption system begins its flip-flop alternation using the embedding model: '0' represented by ETR (extended to the right) and '1' represented by ETL (extended by the left), with the alternation rule of (3/LN, 2/PR, 3/PG, 2CH). Another assumption is that the initial point and random are not applied for the time being. Then, the binary mode will change when it meets third line in the first paragraph, from '0' with ETL and '1' by ETR. However, do not forget that the encryption system will change the binary mode when the paragraph is finished with only two lines, such as 'the weather was very humid and hot even in the shadow behind a grey building'. The alternation rule says that the binary mode changes every 2 paragraphs but does not change if the line number does increase up to multiple of 3. Then, when the encryption system meets multiple number of 3, for example, $6^{th}$ line, within the second paragraph, the binary mode changes again '0' by ETR and '1' by ETL.

Likewise, the binary mode of '0' and '1' continuously alternates whenever it meets predefined new line, new paragraph, new page, and new chapter. When the multiple number of the parameters overlap, such as 6 lines (LN)=2 paragraph (PR), or 120 lines (LN)=2 page (PG), the binary mode does not change. However, when three parameters overlap, such as in the situation of 120 lines (LN)=9 paragraph (PR)=2 page (PG), then the binary mode should change.

Using those parameters in the alternation rule, the encryption system can hide User ID into some spaces in the plain text, as shown in FIG. 15. The example shows every 3 lines, 2 paragraphs, 3 pages, and 2 chapters the binary representation mode changes.

Figure 16:
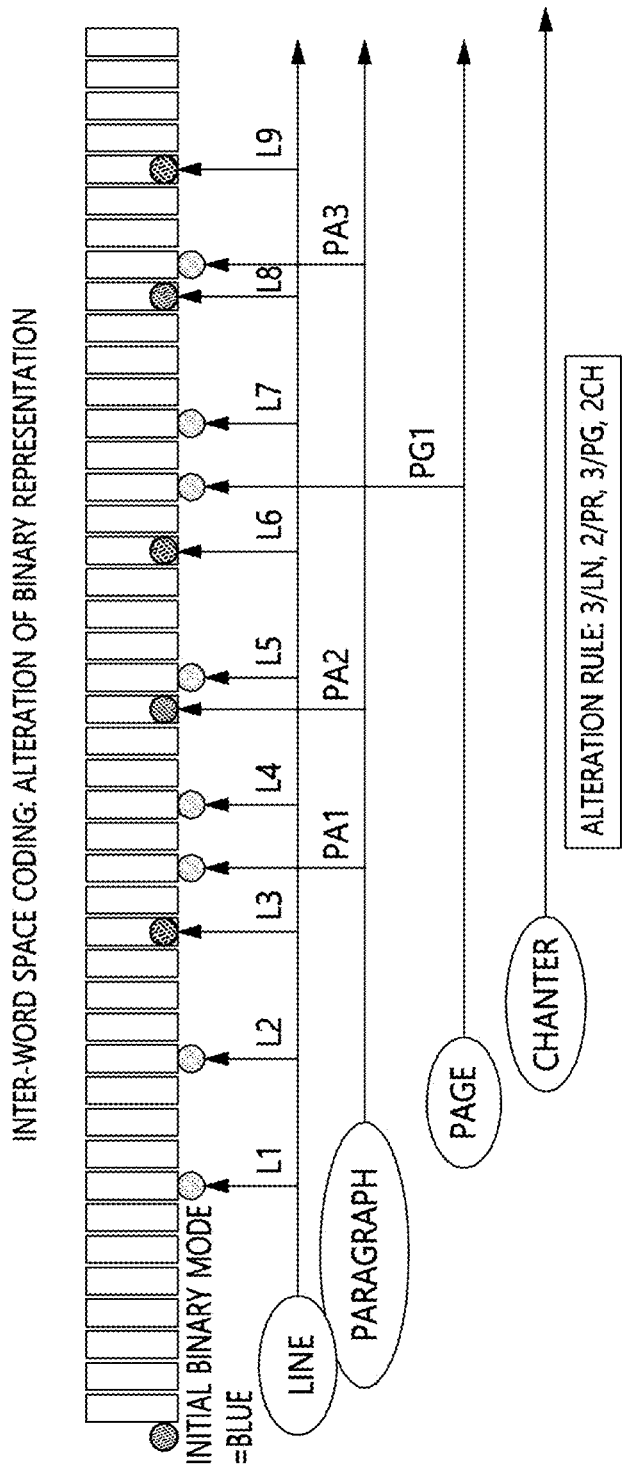
FIG. 16 depicts inter-word coding performed through alternation of binary representation according to the rule of FIG. 15.

FIG. 16 depicts inter-word coding performed through alternation of binary representation according to the rule of FIG. 15.

Referring to FIG. 16, the same alternation rule can be depicted in another frame. The binary representation mode changes whenever the encryption system meets predetermined 'change of binary representation mode', from '0' to '1', and from '1' to '0' whenever it meets multiple of 3 lines, 2 paragraphs, 3 pages, and 2 chapters to refresh the binary representation mode.

In FIG. 16, the binary representation mode which is initiated by 'blue color' continuously changes to 'red color', then alternates to 'blue color' again, which is repeated many times.

In the example cases shown above, the changes of the binary representation mode, 'blue color' or 'red color' indicates '0' or '1', a single bit of the encrypted document. A problem encountered when the encrypted document should be decrypted is that the amount of encrypted information is too small, when the encryption is applied using changes of line, paragraphs, etc. In this case, the encryption parameter can change to smaller unit of spaces such as inter-word space. For example, the alternation rule says it that the binary mode should change every 3 inter-word, much smaller unit in documents. In this case, that is, the binary mode changes whenever the encryption system meets 3 inter-word space. It is shown in the FIG. 17.

FIG. 17 depicts binary mode switch according to the coding of FIG. 16.

Referring to FIG. 17, binary mode switch occurs in the $5^{th}$ inter-word space. Then, from application of 3/LN of the alternation rule, mode switch occurs in the $12^{th}$ inter-word space which corresponds to the start point of the $4^{th}$ line. Next, by applying 2/PR, mode switch occurs in the $18^{th}$ inter-word space which is the start point of the $2^{nd}$ paragraph. Next, again, by applying the 3/LN, mode switch occurs in the $24^{th}$ inter-word space which is the start point of the $7^{th}$ line and in the $35^{th}$ inter-word space which is the start line of the $10^{th}$ line. Next, mode switch may occur in the $38^{th}$ inter-word space which is the start point of the $4^{th}$ paragraph.

Figure 18:
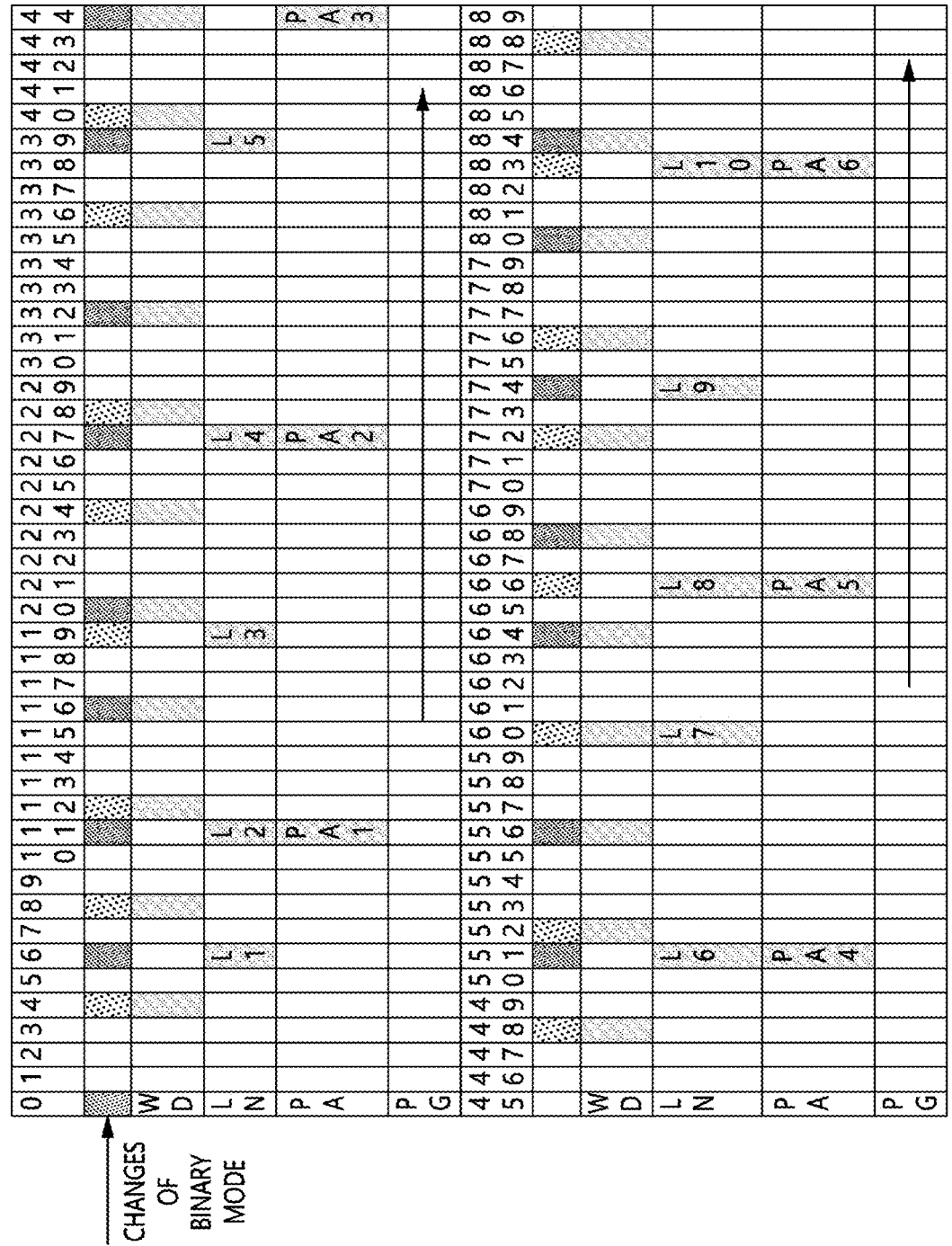
FIG. 18 depicts binary mode switch in one page.

FIG. 18 depicts binary mode switch in one page.

Referring to FIG. 18, the alternation rule may be configured so that mode switch exists every three words, mode switch occurs for each line, and mode switch exists every paragraph. Through this configuration, when it is assumed that the initial binary mode exists in the 0-th space, mode switch occurs in the $4^{th}$ space according to the inter-word switch rule. Mode switch occurs in the $6^{th}$ space according to the inter-line mode switch rule, and mode switch occurs in the $8^{th}$ space according to the inter-word mode switch rule. Next, mode switch occurs in the $11^{th}$ space according to the inter-line mode switch rule and the inter-paragraph mode switch rule. At this time, when two alternation rules overlap each other, it may be handled so that only one mode switch is occurred. In some cases, whether to apply mode switch may be determined differently based on the number of overlapping rules. For example, if an even number of rules overlap each other, mode switch may be made not to occur, but mode switch may be made to occur only when an odd number of rules are overlapped. This configuration may be changed through a user setting. Next, mode switch occurs in the $12^{th}$ space according to inter-word mode switch rule. If mode switch of one page is handled as described above, attackers may get confused, which make it difficult for attackers to attempt an attack.

FIG. 19 depicts a data file for encryption and decryption through a text watermarking method according to one embodiment of the present disclosure.

Referring to FIG. 19, to perform a text watermarking method according to one embodiment of the present disclosure, a data file for encryption and decryption may be required. The corresponding file defines various parameters and related rules required to perform encryption and decryption. The data file defines ETR and ERL and the corresponding binary representations. Also, the data file defines parameters indicating a current binary mode. And the data file contains information on the number of inter-word spaces, the number of lines, the number of paragraphs, the number of pages, and the number of chapters. Also, random keys and values derived from the random keys are included therein. Predetermined random key values and random head/tail key pointers derived from the random key values, and random head/tail counter values are included therein. Also, ECC code values to be attached to the head and tail may be included therein.

FIG. 20 depicts a flow chart illustrating flip-flopping text watermarking algorithm according to an embodiment of the present invention in which the inter-word space adjustment is conducted with flip-flopping, based on algorithm to change direction of flip-flopping and determine the initial watermarking embedding.

Encryption begin with the first binary mode. For example, it can start with ETR for representing '0' and ETL for representing '1'. Then, the binary mode of bit representation should be recorded in the file of encryption including alternation rule, as shown in FIG. 20.

Referring to FIG. 20, the watermark embedding can be described as the following:

(1) User ID conversion: The user ID should be converted into a new ID through a symmetric encryption algorithm, for example DES, or AES, with a fixed enterprise key (S2002). However, it is not necessary to perform change of the USER ID. Also, according to the embodiments of the present disclosure above, at this time, indents and random head/tail keys are derived by using the given random keys, and an encryption block is generated by using the derived values and the USER ID.

(2) Then, page contents obtained from dividing the contents for each page and watermark variable information are obtained S2004.

(3) Next, applying 3 component embedding rule to each page  as <m, n, p>: (3-1) calculate MOD (page number/m) to determine where to begin watermark embedding in the specific page (S2006). (3-2) And then, move embedding to MOD position in the page (S2008). (3-3) calculate MOD (line number/n) to reverse when MOD (line number/m)==0 (S2010).

Here, page start alternation (m) indicates where the watermark embedding begins, while line alternation (n) indicates the alternation of watermark mode. The number of page start alternation (m) specifies where inter-word watermark embedding starts in the corresponding page. That is, the number of page start alternation (m) moves the first watermarking embedding point in each page to the specified point, which is determined by the value of MOD (page number/page start alternation). The value of MOD (page number/m) designates the starting position where the first embedding begins in the page. For example, if the page start, m is set to 3, in the pages having value of MOD (page number/3)=0, such as 0, 3, 6, 9, . . . , watermark embedding will begin at the first inter-word space. The remainder of division (page number divided by m), 0, 1, 2, indicates that watermark embedding begins at the first inter-word space, second inter-word space, and third inter-word space, respectively. Watermark embedding in every page turns around the page start alternation number, m, to make watermark embedding process complicated.

Line alternation (n) indicates that the basic watermark mode should change every n lines. For example, the basic watermark mode reverses every 3 lines, or 4 lines, according to the specification. If line alternation is set to '2', every 2 lines the watermark mode should be reversed, from '0' mode to '1' mode, or from '1' mode to '0' mode. Thus, at the line number of '0', '2', '4, '6', . . . 2n, the basic watermark mode reverses.

The 3 flip-flopping components,  may lead to easy implementation but would lead to frustration of simple guessing, only if the information of 3 components is not disclosed. Let's take an example of 3 component, <m, n, p>. According to the 3 components rule, the basic watermarking mode changes every n lines and watermark embedding begins at inter-character space of MOD (page number/m). In addition, the watermark itself does not have fixed mode and changes its mode several times even in a single page, which can make good guess almost impossible without the watermark variables and enterprise key for encrypting user information using symmetric algorithm.

Here, although only page start alternation, line alternation, and watermark mode are mentioned, the word alternation, paragraph alternation, page alternation, and chapter alternation described above may be additionally considered.

(4) Determine watermark mode. If p=0, then normal mode. Otherwise, applied is reverse mode (S2012).

(5) And then embed watermark into inter-word space (S2014).

(6) When watermark embedding is finished in the end of a page, then it goes to step (2) (S2016).

Then, detection process can be described as following:

(1) Get a watermarked text.

(2) Get the 3 components data of each user from a secure DB in the server, <m, n, p>.

(3) Find the basic watermark mode from p value.

(4) Calculate MOD (page number/m) to find the first watermark embedding position in the page. Change the basic watermark mode (line alternation/n=0) in the first line.

(5) From the second line, calculate MOD (line alternation/n) to reverse the basic watermark mode when the value of MOD (line alternation/n)==0.

(6) Read the watermarked information until end of the watermarked position is reached.

(7) Repeated the processes (3) to (6).

In other embodiment of the present invention, there may be a very simplified case in which parameters of binary alternation are inter-word space, line-space, and page-number. It is noticeable that the user ID is not originally identifiable one. It is converted into a different number with traditional encryption algorithm, such as RC4 or RC5, to make confusion to the cracking attempts. If the user ID is converted into different number using a regular encryption algorithm, it might be very hard to identify the real User ID without the original User ID.

Encryption unit is an important concept in flip-flop algorithm. As shown above, the encryption can be done with inter-space of inter-word, inter-line, inter-paragraph, or inter-chapter. Because the goal of this encryption is to find some invisible spaces to decrypt hidden information for the purpose of tracing when the data or documents are leaked out in camera-shot form, or printed form. If inter-word space is employed to hide bit information, more information can be hidden in a limited space, rather than inter-line space. However, there is a serious tradeoff between amount of hidden information and decryption errors. If the encryption system utilizes inter-word space, or inter-character space as the unit space of hidden information, more information can be hidden, rather than inter-line space or inter-paragraph space. However, a single mistake made in decryption process can lead to very serious mistake or wrongly interpreted result, indicating nullification of the encryption system or pointing to wrong person as a violator of confidential documents or data. Thus, the decision of encryption unit for alternation rule should be very carefully made: the amount of hidden information vs. error rate of decryption process.

Also, another issue is how to handle Table, Figure, Image, Mathematical Equations, or Quoted paragraphs in a document or data. Many times, the encryption block can overlap paragraphs which include graphs, images, or tables. In this case, it is important how to skip those spaces existing between paragraphs or tables, even new chapter. As the important purpose of this encryption is to hide information as much as possible, the encryption system can skip those obstacles such as tables, figures, images, or new chapters. Then, the spaces left in the documents or data can be used for encryption.

Meanwhile, regarding encryption block, the encryption block in flip-flop text watermark is initiated with error correction code (ECC), for a fixed set of encryption spaces whether they are inter-word spaces, or inter-line spaces, depending on definition of encryption space. It is recommended that the ECC of the encryption system uses a block of code, such as '00000000' or '11111111' consecutive bit of '0' or '1' in the front and in the tail of the encryption block to identify each encryption block. There can be a case where the encryption block should be initiated in each chapter, table, diagram, or non-text portion of document or data set, depending on the definition of encryption block.

Figure 21:
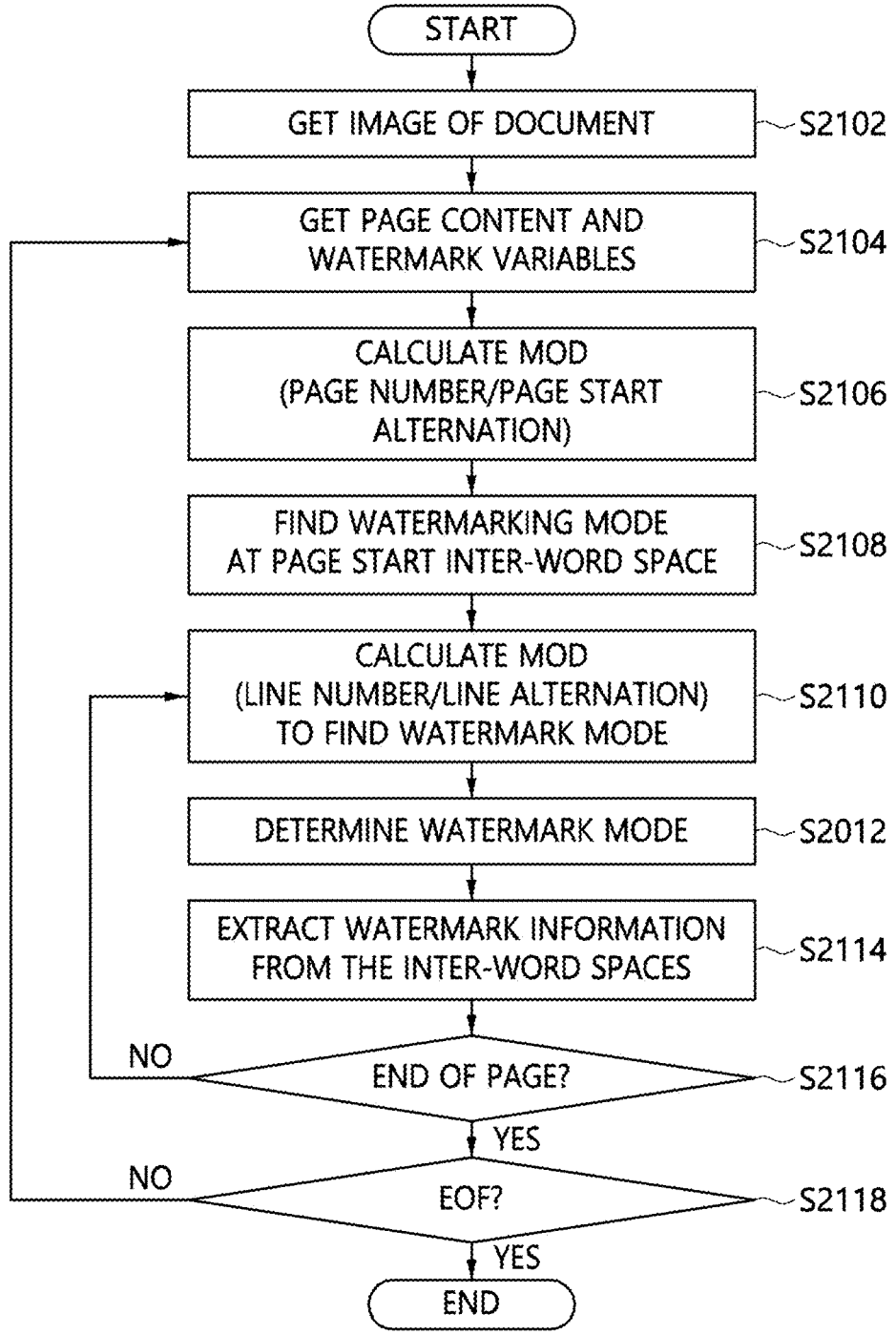
FIG. 21 depicts a flow chart illustrating text watermark extraction, which is a reverse of embedding process.

FIG. 21 depicts a flow chart illustrating text watermark extraction, which is a reverse of embedding process.

Referring to FIG. 21, text watermarking extraction process can be described as followings:

(1) Get an image of document (S2102).

(2) Get a page content and watermark variables  designated by <m, n, p> (S2104).

(3) Calculate MOD (page number/m) (S2106).

(4) Move initial extraction position into MOD (page number/m)$^{th}$ inter-word space (S2108).

(5) Find the basic watermark mode and calculate MOD (line number/n) (S2110).

(6) Determine the correct watermark mode using the calculated value (S2112).

(7) Extract watermark information from the inter-word space with the correct watermark mode (S2114).

(8) If the watermark extractor moves to the next line, go to process (5) (S2116).

(9) When watermark extraction is finished in the end of a page, then it goes to process (2) (S2118).

(10) Check whether the same USER information c.

Meanwhile, decryption of the flip-flop text watermarking might be more difficult than encryption. If there are encryption errors or physically twisted lines, or obscured lines, it can be interpreted in different ID. For the reason, the random number plays an import role, anchor in flip-flop algorithm. Length, changing mode (incremental or decremental) of the random key are flexible and thus does not allow intelligent guess. In order to identifying the encryption block, using ECC (16 bit of continuous binary code, 1111111x0000000y) is desirable.

Additionally, in conjunction with image watermarking, image watermarking is another topic of research area which can hide User ID into digitized image. The text watermarking algorithm according to one embodiment of the present disclosure may be used in conjunction with image watermarking. For example, a watermarked text may be used in a way that it is embedded in an image.

Figure 22:
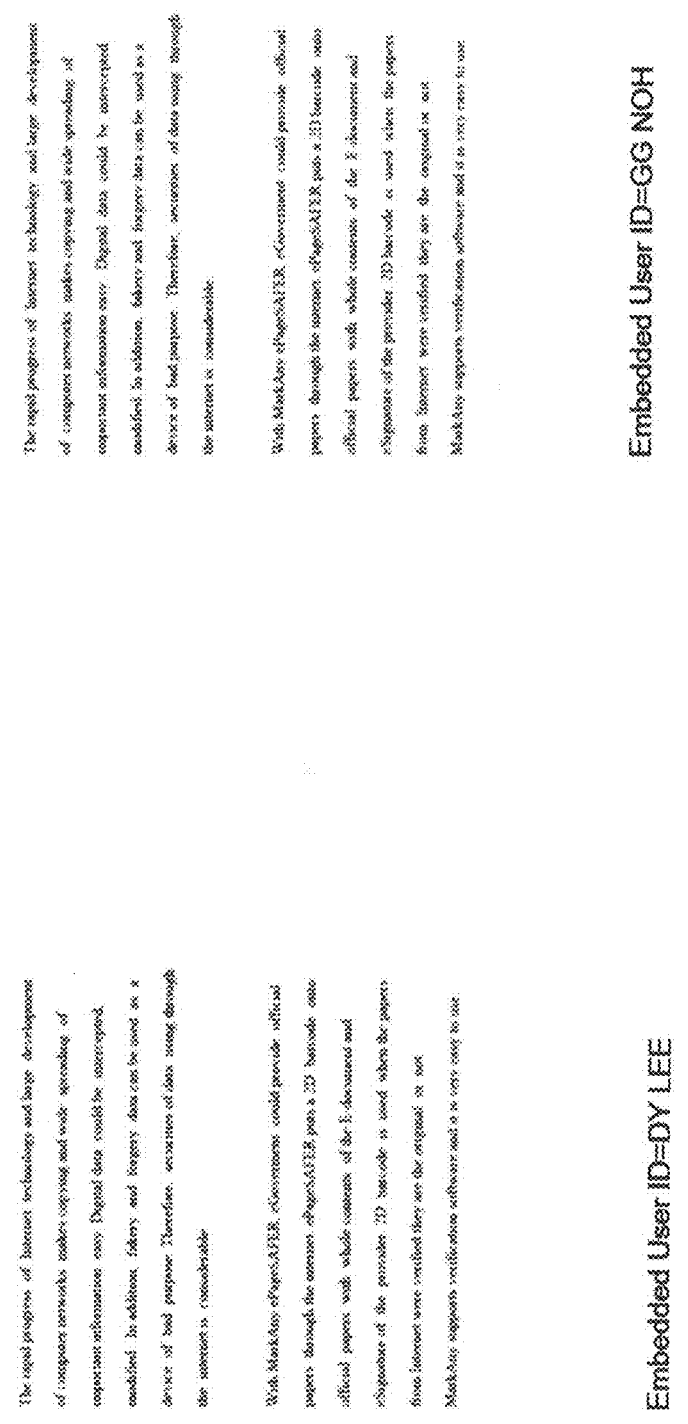

FIG. 22 depicts sample of text watermark application.

Referring to FIG. 22, watermark embedded text shows successful invisibility. This case shows that more than 40 bits data can be hidden in invisible text watermark and successfully extracted from scanned paper-image based on the algorithm described above. The original text authored in a MS word was converted in the PDF file format and watermarked using 40 bits of a user ID. When it was scanned and tested for extraction of hidden data which showed successful identification of a user ID.

FIG. 22 hides user information of DY LEE (the left one) and GG NOH (the right one). Visible difference between those documents is minimalized so that users cannot differentiate.

Figure 23:
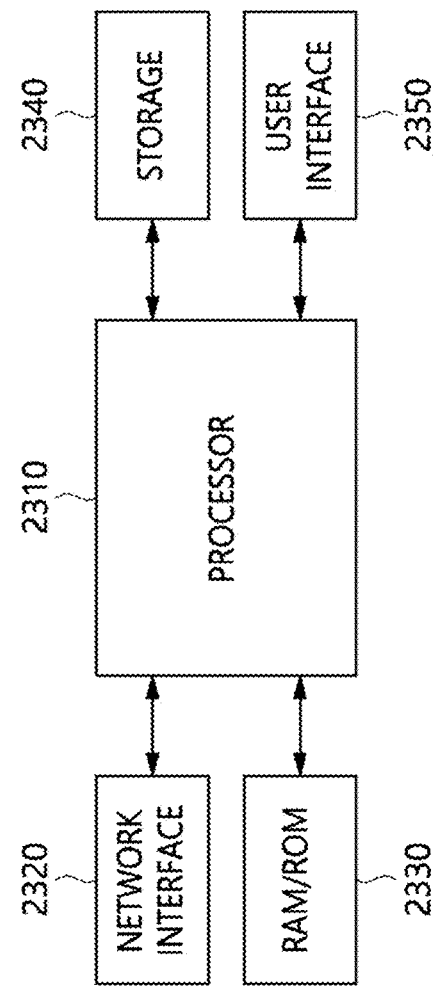
FIG. 23 depicts a block diagram illustrating a text watermarking apparatus according to one embodiment of the present disclosure.

FIG. 23 depicts a block diagram illustrating a text watermarking apparatus according to one embodiment of the present disclosure. As shown in FIG. 23, the text watermarking apparatus may comprise a processor 2310, a network interface 2320, RAM/ROM 2330, a storage 2340, and a user interface 2350.

Referring to FIG. 23, the network interface 2320 is a constituting element that performs communication with an external device through a wired and/or wireless network. The network interface 2320 may include an antenna and/or a communication processor.

The processor 2310 is implemented by a central processing unit (CPU) or a semiconductor device that executes commands stored in the RAM/ROM 2330 and the storage 2340. The processor 2310 generates an encryption block based on encryption variable set information, divides a target document in units of pages (or in other units), and embeds the divided pages into generated page contents. Also, a user ID may be extracted based on the encryption variable set information from the contents into which an encryption block has been embedded. The processor 2310, being connected to the RAM/ROM 2330 and the storage 2340 through signal lines, run programs stored in the RAM/ROM 2330 and the storage 2340.

The RAM/ROM 2330 and the storage 2340 are storage devices that store programs to be run in the processor 2310 and data processed by the processor 2310. The RAM/ROM 2330 and the storage 2340 may include various forms of volatile or non-volatile storage media.

The user interface 2350 includes an information input means such as a keyboard or a mouse; and an information output means such as a monitor, a TV, or a touchscreen. The user interface 2350 is used for changing various configuration values related to encryption (decryption) and displaying related contents.

Accordingly, an embodiment of the invention may be implemented as a computer implemented method or as a non-transitory computer readable medium with computer executable instructions stored thereon. In an embodiment, when executed by the processor, the computer readable instructions may perform a method according to at least one aspect of the invention.

What is claimed is:

1. A text watermarking method, the method comprising:
   inputting encryption variable set information with which to encrypt a target document, wherein the target document includes text;
   generating an encrypted block based on the encryption variable set information; and
   embedding the encrypted block into the target document by using an embedding rule of the encrypted block,
   wherein the encryption variable set information includes a predetermined random key value, a user ID, and information indicating the embedding rule of the encrypted block,
   wherein the predetermined random key value and the information indicating an embedding rule of the encrypted block are managed in a non-disclosure manner, and
   wherein the encrypted block includes indents arranged to bring confusion in determining a start point and an end point of the encrypted block.

2. The method of claim 1, wherein the target document is divided in units of pages into page contents,
   wherein at least one of a plurality of different encrypted blocks is arranged in each of the divided page contents.

3. The method of claim 2, wherein each of the plurality of different encrypted blocks comprises i) the indent, (ii) derived random key values, and (iii) the user ID.

4. The method of claim 3, wherein the indent and the derived random key value are derived by at least part of the predetermined random key value.

5. The method of claim 4, wherein the indent and the derived random key value is derived by a value extracted during movement by a predetermined unit of length in at least one of forward and backward directions from at least one of a front portion and a rear portion of the predetermined random key value.

6. The method of claim 5, wherein the derived random key value includes a random head key value and a random tail key value.

7. The method of claim 6, wherein length of the random head key value is determined by a value extracted during movement by a first length in the forward direction from a front portion of the predetermined random key value.

8. The method of claim 7, wherein a start point of the random head key value starts from end point of a piece of the predetermined random key value used for deriving a random head key value of a previous encrypted block.

9. The method of claim 7, wherein a start point of the random head key value is calculated by $$\text{MOD}[\Sigma P_n/\text{Number of Round}],$$

wherein Number of Round represents an index of a target encrypted block for calculating the start point, and $P_n$, represents the n-th portion of the predetermined random key value.

10. The method of claim 1, wherein the indent includes a head indent arranged in a front portion of the encrypted block and a tail indent arranged in a rear portion of the encrypted block,
   wherein the head indent is determined by a value extracted during movement by a second length in the forward direction from a front portion of the predetermined random key value,
   wherein the tail indent is determined by a value extracted during movement by the second length in the backward direction from a rear portion of the predetermined random key value.

11. The method of claim 1, wherein length of the indent is flexible.

12. The method of claim 1, wherein length of the encrypted block is dependent on the predetermined random key value and flexible.

13. The method of claim 3, wherein each of the plurality of different encrypted blocks is arranged in the order of a head indent, a random head key, a user ID, a random tail key, and a tail indent from a front end to a rear end.

14. The method of claim 3, wherein an error correction code is attached to at least one of the front and the rear portion of the encrypted block.

15. The method of claim 2, wherein the encryption block embedding rule includes a flip-flop text watermarking algorithm,
   wherein the flip-flop text watermarking algorithm includes a rule that alternates a representation mode of binary information of the encrypted block for each predetermined portion of the target document.

16. The method of claim 15, wherein information indicating the encryption block embedding rule includes a variable value of the flip-flop text watermarking algorithm,
   wherein the variable value of the flip-flop text watermarking algorithm includes a variable value indicating the representation mode of the binary information alternating at least every which one of chapters, pages, paragraphs, and lines.

17. The method of claim 16, wherein alternation of the representation mode of the binary information includes alternating manners that change at least one of inter-word space, inter-line space, inter-paragraph space, and inter-chapter space.

18. A text watermarking method, the method comprising:
inputting encryption variable set information with which to encrypt a target document, wherein the target document includes text;
generating an encrypted block based on the encryption variable set information; and
embedding the encrypted block into the target document by using an embedding rule of the encrypted block,
wherein the encryption variable set information includes a predetermined random key value,
wherein the predetermined random key is composed of random numbers,
wherein the encrypted block is composed of (i) indents arranged to bring confusion in determining a start point and an end point of the encrypted block, (ii) random key values derived from the predetermined random keys, and (iii) the user ID.

19. The method of claim 18, wherein the encrypted block is arranged in the order of a head indent, a random head key, a user ID, a random tail key, and a tail indent from the front end to the rear end.

20. A text watermarking apparatus, the apparatus comprising:
an interface module configured to input encryption variable set information with which to encrypt a target document, wherein the target document includes text; and
a processor configured to generate an encrypted block based on the encryption variable set information and embed the encrypted block into the target document by using an embedding rule of the encrypted block,
wherein the encryption variable set information includes a predetermined random key value, a user ID, indents arranged to bring confusion in determining a start point and an end point of the encrypted block, and information indicating an embedding rule of the encrypted block, and
wherein the predetermined random key value and the information indicating an embedding rule of the encrypted block are managed in a non-disclosure manner.

* * * * *